(12) United States Patent
King et al.

(10) Patent No.: US 6,775,080 B2
(45) Date of Patent: Aug. 10, 2004

(54) DATA ACCESS DEVICE IMPLEMENTED WITH OPEN AND CLOSED CONTROL LOOPS TO ACCESS DATA STORED IN DISCRETE STEPWISE SEGMENTS

(75) Inventors: Francis K. King, San Jose, CA (US); Jeffrey F. Liu, San Jose, CA (US)

(73) Assignee: DCARD, Inc., Milpitas, CA (US)

( * ) Notice: Subject to any disclaimer, the term of this patent is extended or adjusted under 35 U.S.C. 154(b) by 317 days.

(21) Appl. No.: 09/774,200

(22) Filed: Jan. 29, 2001

(65) Prior Publication Data

US 2001/0033446 A1 Oct. 25, 2001

Related U.S. Application Data

(63) Continuation-in-part of application No. 09/289,427, filed on Apr. 9, 1999.
(60) Provisional application No. 60/081,257, filed on Apr. 9, 1998.

(51) Int. Cl.[7] .................................................. G11B 5/09
(52) U.S. Cl. ................................ 360/48; 360/2; 360/75; 235/493
(58) Field of Search ............................... 360/2, 75, 48; 235/493, 494, 449, 454; 369/275.3

(56) References Cited

U.S. PATENT DOCUMENTS 5,053,611 A * 10/1991 Takahashi et al. .......... 235/454
5,056,080 A * 10/1991 Russell ........................ 369/100
5,059,774 A * 10/1991 Kubo et al. .................. 235/454
5,144,552 A *  9/1992 Abe ........................... 369/275.4
5,617,391 A *  4/1997 Ono et al. ..................... 369/48
5,875,061 A *  2/1999 Kaaden et al. ................. 360/48
6,016,959 A *  1/2000 Kamo et al. ................. 235/449
6,119,261 A *  9/2000 Dang et al. .................. 714/769

FOREIGN PATENT DOCUMENTS

JP            01201827  A  *  8/1989  ............ G11B/7/00

* cited by examiner

Primary Examiner—David Hudspeth
Assistant Examiner—Dan I Davidson
(74) Attorney, Agent, or Firm—Bo-In Lin

(57) ABSTRACT

This invention discloses a data access system for access data stored on a flat medium. The data access system includes a pickup head rotating over the flat medium. The data access system further includes at least one stepping motor for discretely moving the flat medium substantially along at least one lateral direction perpendicular to a rotational axis of the pickup head. The data access system further includes a closed loop control mechanism for controlling the stepping motor for allowing the pickup head to read data from a servo segment on the flat medium. The controller further includes an open loop control mechanism for rotating the pickup head for reading data from and writing data to a data segment disposed right next to the servo segment on the flat medium.

6 Claims, 22 Drawing Sheets

| | | | | A | | A | | Data Track N+5 |
|---|---|---|---|---|---|---|---|---|
| S Y N & A D M | S T I D X | E D I D X | G R A Y C O D E | | B B | | B B | Data Track N+4 |
| | | | | A A | | A A | | Data Track N+3 |
| | | | | | B B | | B B | Data Track N+2 |
| | | | | A A | | A A | | Data Track N+1 |
| | | | | | B B | | B B | Data Track N |
| | | | | | | A | | |

DATA ACCESS DEVICE IMPLEMENTED WITH OPEN AND CLOSED CONTROL LOOPS TO ACCESS DATA STORED IN DISCRETE STEPWISE SEGMENTS

This application is a Continuation-in-Part application (CIP) of a previously filed Provisional Application No. 60/081,257 filed on Apr. 9, 1998 and a Formal application Ser. No. 09/289,427 with an attorney docket number DCARD-9907 filed on Apr. 9, 1999, by one of a common inventors of this Patent Application.

BACKGROUND OF THE INVENTION

1. Field of the Invention

This invention relates generally to systems and method for reading data from and writing data to data storage medium by employing the magnetic or optical recording technology. More particularly, this invention is related to a data access system implemented with stepping motors using open and closed control loops to position a flat medium with data stored in discrete stepwise curved segments accessed by a rotational pickup head controlled with servo data feedback from each stepwise discrete segment.

2. Description of the Prior Art

Conventional methods of reading data from and writing data to data-storage tracks with these tracks formed either as circular tracks or separate segments as parts of a circular track present technical difficulties when stepping motors are employed for moving the pickup head to access high density data tracks. Due to these technical difficulties, stepping motors moved in discrete stepwise movements and controlled with open-loop control schemes, are typically implemented in data-access operations of lower data density. In a data track, typically a circular track, that has a lower data storage density the spot size for data-bit storage is large enough to accommodate a larger tolerance of radius variations as the disk rotates over a pickup head for accessing data stored in the data tracks. For this reason, an open-loop control would be sufficient for carrying out the data access functions by moving a data disk or a pickup head in a stepwise manner to a particular track on a relatively low track density device such as a conventional floppy disk. And, the pickup head is applied to read or write data on that track without further position control of the data access functions. It is expected that the circular track or arc segment(s) prescribed by the pickup head would match the data-storage track formed either as a circular track or circular segment.

Based on these operational principles, there are many prior art disclosures for data recording and access systems implemented with group of concentric circular data tracks. Prior art patents disclose the storage and data access technologies in U.S. Pat. No. 3,596,061 issued on Oct. 14, 1968 to Pasini, U.S. Pat. No. 5,526,328 issued on Jun. 11, 1996 to Oshima et al., and U.S. Pat. No. 6,052,347 issued on Apr. 18, 2000 to Miyata et al. In addition to the concentric circular data tracks, continuous circular or linear segments employed for data storage and access are also known in many prior art disclosures. These disclosures provide group of data tracks as circular arcs or linear line segments to store and retrieve data on a flat media. The prior art patents include U.S. Pat. No. 3,716,678 issued on Nov, 9, 1970 to Starr, U.S. Pat. No. 3,598,965 issued on Aug. 10, 1971 to Nagata et al., U.S. Pat. No. 5,107,099 issued on Apr. 21, 1992 to Smith, U.S. Pat. No. 5,963,513 issued on Oct. 5, 1999 to Lemelson, U.S. Pat. No. 6,016,959 issued on Jun. 25, 2000 to Kamo et al., U.S. Pat. No. 5,521,774 issued on May 28, 1996 to Parks et al., U.S. Pat. No. 6,084,850 issued on Jul. 4, 2000 to Gudesen et al., U.S. Pat. No. 5,045,676 issued on Sep. 3, 1991 to Kime, U.S. Pat. No. 4014604 issued on Mar. 29, 1997 to Schwartz, U.S. Pat. No. 5,059,774 issued on Oct., 9, 1991 to Kubo et al.

These earlier teachings use oscillating pivot rotating arms or oscillating flat media to access such plurality of data tracks. Smith (U.S. Pat. No. 5,107,099) teaches a method of rotating flat media and a fixed head mechanics to produce and retrieve such plurality of data arc tracks in the circular arc forms in additional to the mechanics of oscillating pivoted rotating head arm to a fixed flat media. Gudesen (U.S. Pat. No. 6,084,850) further extended such rotating media arrangement. Smith (U.S. Pat. No. 5,107,099) failed to teach the using of full rotational head mechanics to a flat media. Kamo (U.S. Pat. No. 6,016,959) recognized the full rotational head mechanics to produce and retrieve such plurality of data tracks in the circular arc forms. Kamo insists such mechanics requiring one or multiple pair of such rotational heads together to achieve such result even only one or more head is active for data access, one or more dummy head must be used to pair odd number of active heads. Kamo also teaches the loading of flat media to the mechanic in static mode that engage to pickup head at the placement of flat media to the device and disengage the pickup head at the removal of the flat media from the device.

For data retrieval and recording access, some of prior art teachings apply open loop to place the signal pickup head to desired data tracks under a relative low track density arrangement and expect the prescribed arc segment by the pickup head matches the recorded data circular arc. When the data track density becomes relative high, prior teachings use closed loop design or servo method to place the signal pick head to the desired data area that follows the profiles of recorded track. The track profile is expected to be a continuous circular arc or line. When a stepper motor is applied into track following, the motion of a stepper motor is discrete. The continuous track following of data segments becomes very difficult and almost impossible. Usually the radius of rotating head of servo writer is different from a drive, the continuous track following by the drive head along a servo written track is physically impossible by a stepper motor access mechanism that can only provide discrete motions.

Specifically, when the data-storage density is increased and a stepping motor is employed, technical difficulties arise due to the discrete and open loop features of the stepping motor movements. A continuous circular movement of the pickup head rotating over the data storage medium may not precisely track the profile of the actual locations of the stored data written onto the data storage medium. The difficulties of continuous track following of the data segments or a circular track can be clearly appreciated because the radius of the rotating head of a servo writer is different from that of a data drive. In addition to the difference in radiuses between that of the servo drive from that of a data drive in reading or writing the data, there are also differences of radius between every two drives used in writing and reading a data card. When the density of data storage becomes higher and the tolerance of data track following is reduced, implementation of stepping motor to adjust a relative position between a pickup head and a circular track or circular segments becomes impractical. For these reasons, the conventional circular track or arc segments as part of a circular track are no longer suitable.

In addition to the above difficulties, the rotational head data recording and retrieving system as that disclosed in a co-pending patent application is implemented to resolve the difficulties of the conventional technology. Specifically, in conventional data storage systems, the reading and writing of data are performed on concentric circular data tracks. The concentric data track configuration often presents a problem that the data-bit density varies between the outer tracks and the inner tracks. The variable bit density in data storage is due to a geometrical factor that the outer data tracks are much longer in length than the inner tracks. A common practice is to form the inner tracks with a capacity to store the data bit at a higher bit density. A more complicate servo control system implemented with more complex signal-processing algorithms is required due to the variations of data storage density between different data tracks. Additionally, by varying the data storage density from the inner tracks toward the outside tracks, the data transfer rate is also changed in accessing data from the inner tracks then outside tracks. Such variation may also cause difficulties and complications in processing the data. Higher error rates may incur due to these variations between the inner tracks and the outer tracks.

There have been designs using pickup head with oscillating arm to prescribe multiple parallel data arcs at a flat data media and a constant data recording density for easier data access arrangement. There are also designs to use single or multiple rotating head pairs to prescribe multiple data arc segments on a circular track and/or on such multiple parallel track arrangements. All such designs required either pickup head with oscillating arm or head pairs configuration. All prior designs also require that the flat media to be statically positioned to signal pickup heads once the flat media is engaged or inserted to the device.

An invention implemented with a rotational-head for data recording and retrieving as that disclosed in a co-pending patent application is able to resolve the above-described difficulties of uneven data storage densities. However, the difficulties in track following to accurately adjust the position of a pickup head relative to the data tracks can not be resolved by the techniques disclosed in all of the prior art disclosures discussed above in a data access system implemented a stepping motor with open-loop discrete movements.

Therefore, a need still exists for an improved data access system and data-card operated with new configuration and control loops to overcome the technical difficulties as described above. Specifically, the storage card drive system shall provide a uniform density for data storage. Also, the data card should provide a data tack configuration to conveniently implement a open and closed loop control scheme for precisely adjust the position of a pickup head relative to the data tracks for achieve a track following to access data for high density data tracks. Furthermore, it would be desirable to keep the system portable and can be manufactured with reasonably low cost such that the data access devices can be broadly employed with lower cost barriers.

SUMMARY OF THE PRESENT INVENTION

Therefore, an object of the present invention is to provide a data storage-card drive system with single pickup head moving above the data-storage card in rotational movement. In order to take advantage of a more cost effective configuration by employing a stepping motor for accessing data stored in high density data tracks, special open-and-closed loop control mechanisms are applied with specially arranged servo and data segments for accommodating the stepwise offsets between the servo and data segments. The new data segment arrangements and pickup head control schemes provide a solution to enable those of ordinary skill in the art to use a stepping motor to read data from high density data tracks thus resolves the difficulties encountered in the above mentioned prior art technologies.

Specifically, it is an object of the present invention to provide a data-storage card drive system with single pickup head driven by a motor, e.g., a brushless motor, to rotate over the data-storage card with the rotation axis perpendicular to the card surface. The motor is mounted on a carriage for making vertical movement perpendicular to the data card for engaging and disengaging a signal pick up head to a flat media per data retrieving and recording configurations. An X-Y table is engaged to a stepping motor to discretely move and position the card on the center relative to the rotation of the pickup head. In addition, the discrete movements of the X-Y table is to position the selected data track under a signal pick up head for properly carrying out the data retrieving and recording processes. The data card is formed with a plurality of data track with each track broken into many discrete stepwise segments and each discrete stepwise segment includes a servo segment and a data segment. The data segment and the servo segment are biased from each other with slightly different curvatures. The servo segments provide position and sector offset and position error data as close-loop feedback for controlling the discrete motion of the X-Y table to prepare the pickup head to read the data from the data segment with an open loop control scheme.

Briefly, in a preferred embodiment, the present invention discloses a data card that has a plurality of data tracks disposed on a flat data storage medium. Each of the data arcs further includes a plurality of stepwise discrete segments. Each segment includes a servo segment and a data segment. Each of the servo segments is substantially a circumference segment of a first circle and each of the data segments is substantially a circumference segment of a second circle where the first circle and the second circle has different radius. In a preferred embodiment, the second circle has a substantially equal or slightly shorter radius than the first circle. In another preferred embodiment, the second circle has a substantially equal or slightly longer radius than the first circle. The present invention also discloses a data access system for access data stored on a flat medium. The data access system includes a pickup head rotating over the flat medium. The data access system further includes a stepping motor for discretely moving the flat medium substantially along a lateral direction perpendicular to a rotational axis of the pickup head. In a preferred embodiment, the data access system further includes a closed loop control mechanism for controlling the stepping motor for reading data from a servo segment on the flat medium. The controller further includes an open loop control mechanism for controlling the pickup head for reading data from and writing data to a data segment on the flat medium.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1A:
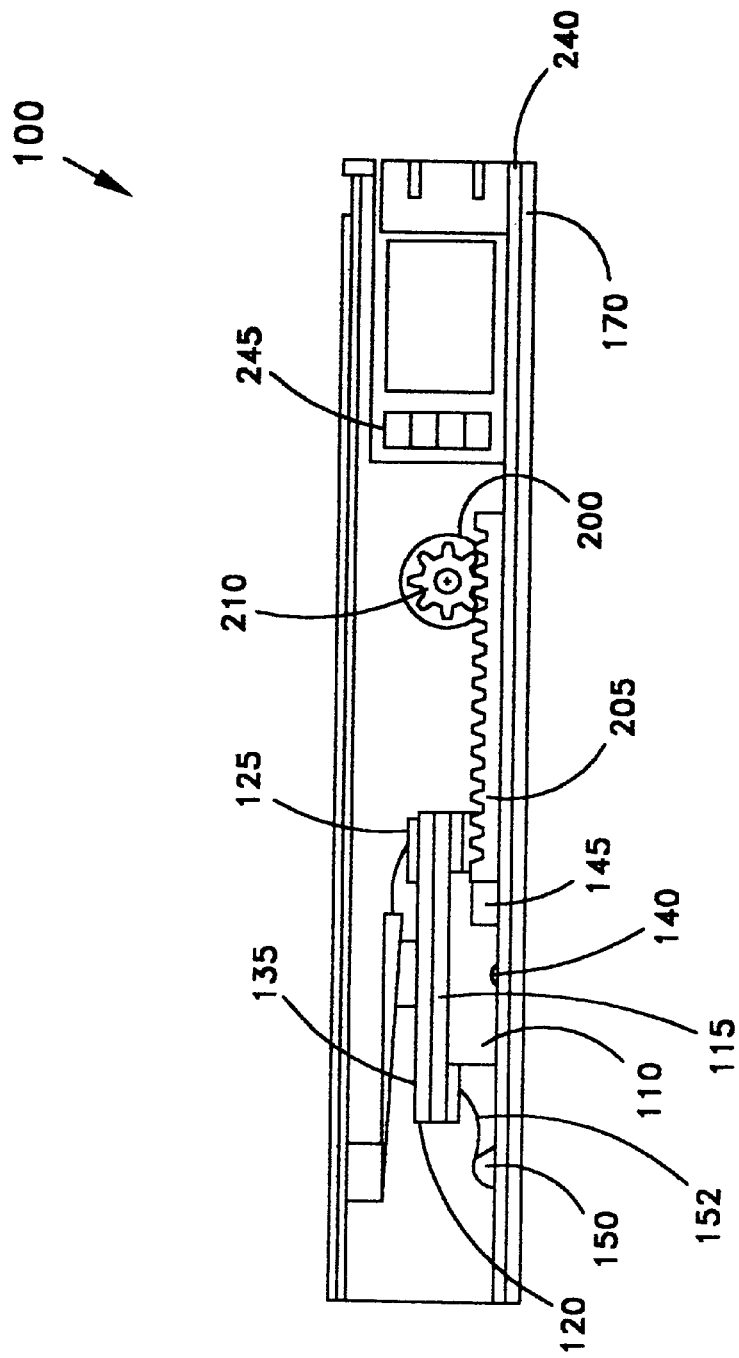
FIGS. 1A and 1B shows a cross sectional view and a top view respectively of a data card drive system of this invention.
Figure 1B:
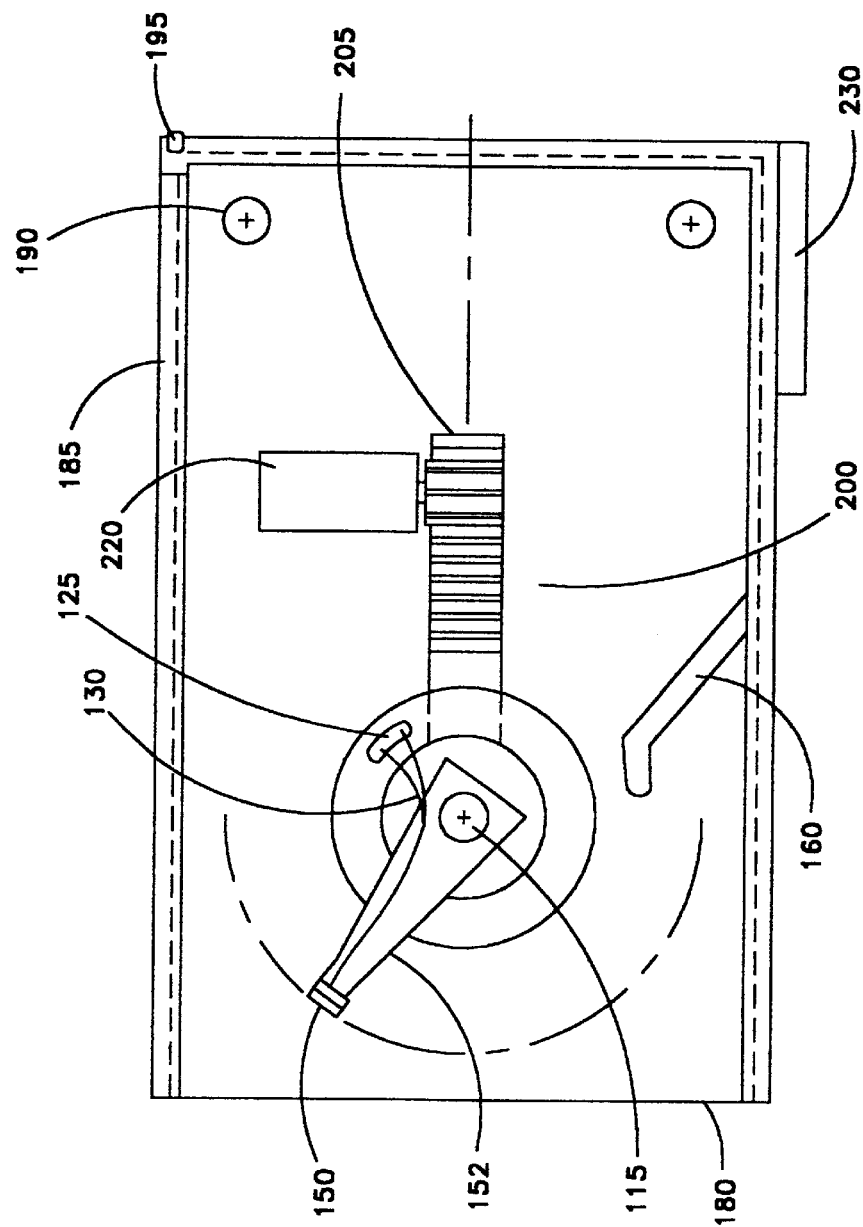

FIGS. 1A and 1B show a cross sectional view and a top view respectively of a data-card drive 100 of the present invention. The data-card drive 100 can be configured for reading and writing data-cards of different sizes, e.g., a PCMCIA type card or common credit card size. The data-card can also be of different shapes such as a square, a rectangular, a circular disk, or a card with straight and parabolic edges or different types of arc-edges. The data-card drive 100 includes a motor 110, e.g., a DC brushless motor. The motor 110 is provided to operate at a low speed to conserve battery power, at high speeds to achieve fast data access time. The motor 110 is further provided to function at two different modes, i.e., a sleep mode when not being deployed, and a wake up mode for normal data access operations. The motor 110 is mounted on a carriage 115 with a pickup head assembly mounted to the motor rotating shaft assembly. Half of a magnetic transformer, 120-1 which can either being a ring type, a round-disk type, or other geometrical shapes, is mounted onto the motor rotating shaft assembly, the other half of the magnetic transformer 120-2 of similar configuration is mounted to the fixed part of motor assembly. Signal wires 130 form head are soldered onto the rotating half of the transformer 120-1 with the soldering pad 125, that can also be a spring pressed connection, for transmitting the read/write signals via the magnetic transformer 120. The magnetic transformer 120-1 and the soldering pad 125 are covered by a magnetic flux shield plate 135 for shielding the magnetic flux generated by the magnetic transformer to prevent DC erase of data. A ground spring 140 is applied to perform the function of dissipating electric static discharges. Optionally, a brake-magnet 145 is provided to fix the "parking" position of the motor 110 in the sleep or power off mode during the time when there is no data access activities.

A read/write head 150 is mounted via an extended head-arm 152 to the brushless motor 110 via a head-arm mounting assembly mounting holes 155 to the head carriage 115. A head loading/unloading arm 160 is mounted on the base-plate 170. The loading/unloading arm 160 presses to the head loading cam that is part of the motor frame 200 at the unload position at a drive-device power-off mode. The loading/unloading arm 160 is either manual or electromechanical control.

In order to assist a smooth loading of the data card 180 into the drive device 100, a card guide plate 185 is provided. The data-card drive system 100 further includes one or several data card pins 190 to engage and fix the position of the data card 180 when the data card 180 reaches a designated operational position. The data card pins 190 increases the compatibility and interchangeability of different types of data cards for data access operations using this data card drive system 100. The drive system 100 further includes an on/off switch 195, which is turned on when the data card 180 reaches its final position.

Figure 1C:
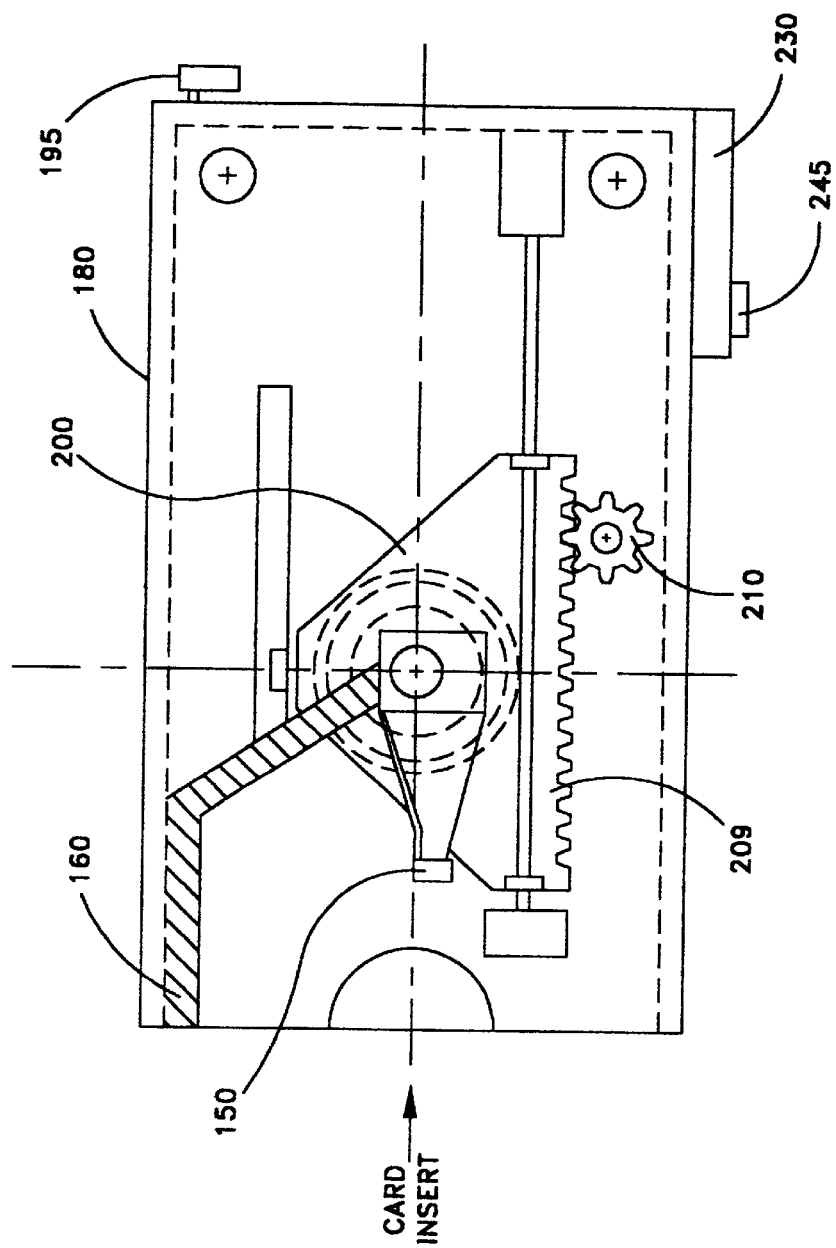
FIGS. 1C and 1D are cross sectional views for showing the details of the motor rack mounting and the head loading/unloading assembly.
Figure 1D:
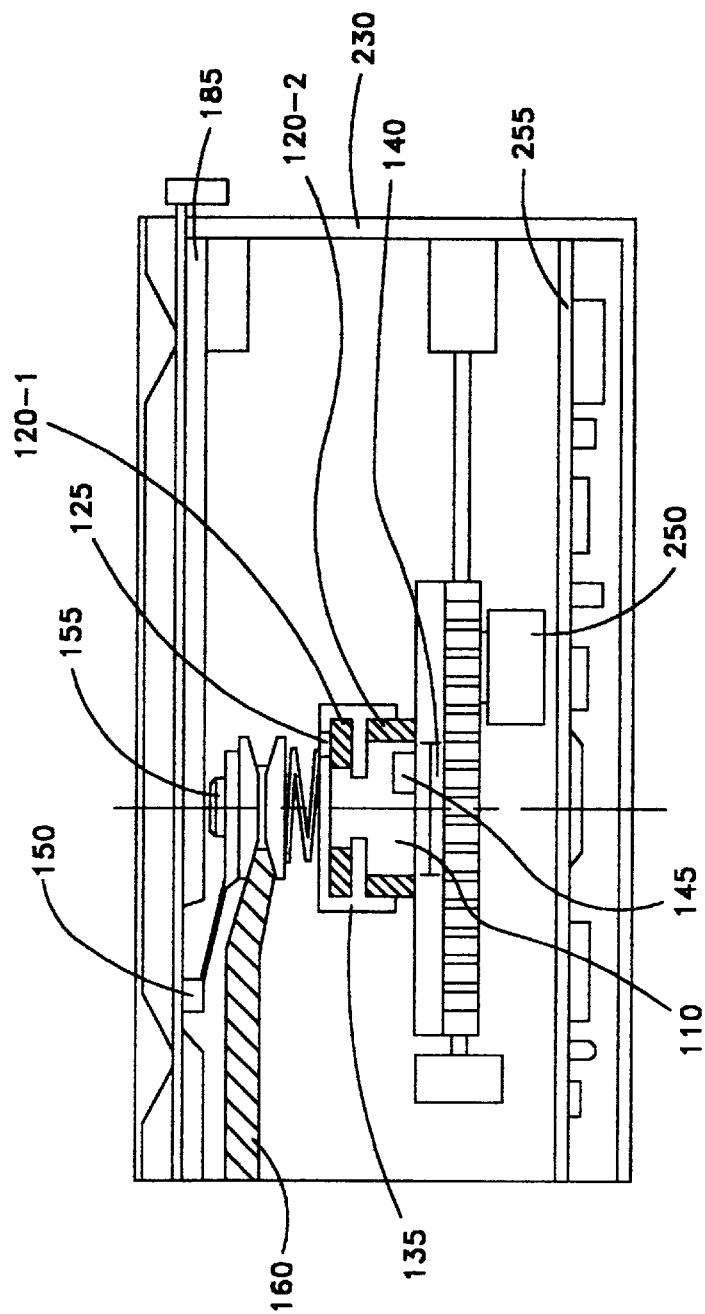

The brushless motor 110 is mounted onto a motor-rack mount 200 with a set of cams. A set of step motors 220 is employed to control the linear lateral movements of the data card 180. The drive device 100 further includes a LCD display 230 to indicate the track position of the head 150 in reading or writing of data onto the data card 180. Mounted on the base plate 170 is a printed circuit board 240, which supports a track locator switch 245. The printed circuit board 240 further supports various kinds of circuits for performing the functions of control and data access. These circuits includes head tracking circuit 250, IC preamplifier 255, head loading/unloading circuits, disable/enable read-write function circuit, servo control integrated circuit (IC), motor control IC, data separator IC. The circuits further includes interface circuits such as ADI interface IC, USB interface IC, PCMCIA interface IC, and also USB connector, PCMCIA connector, and other circuits required for controlling and operating the data card drive system. FIGS. 1C and 1D are cross sectional views for showing the details of the cam 205, the follower 210, and the head loading and unloading assembly 160 to lift the head from a flat media when required. A head arm lifter 103 has a wire type hook 103A positioned above the pickup head arm 152. The sliding of the head arm lifter 103 with the wire type hook 103A along the motor shaft assembly can lift or lower the pickup head arm 152 and in turn lift or lower the pickup head 150. The pickup head follower 152 is rotating with the motor shaft and the pickup head 150. Regardless of where the pickup head 150 when the rotational movement stops, the follower 152 can always engage into the head lifter cam 103 slot and sliding the head lifter 103 along the motor shaft.

The drive device 100 as described above is also provided with an option to perform the functions of a servo writer. A novel servo writer is disclosed in this invention which can be manufactured with simplified manufacturing processes. The servo writer includes a storage card loading assembly that is structured similarly to a card guide 185 of the device 100. The storage card can be inserted horizontally inserted for direct contact with the pickup head 150. Or, depending on specific application, the data storage card can be inserted from a vertical slot opening and then flip over for contact with the pickup head. In writing the servo data, the pickup head 150 is rotating along different data tracks. The flat media is moved to different tracks during the operation of writing servo data by either moving the head/motor assembly mounted on the shaft or by keeping the head/motor assembly stationary while horizontally moving the data storage card. The magnetic transformer is employed in writing the servo data onto different data tracks where the cables are arranged without being twisted when the pickup head is making rotational movement.

Figure 1E:
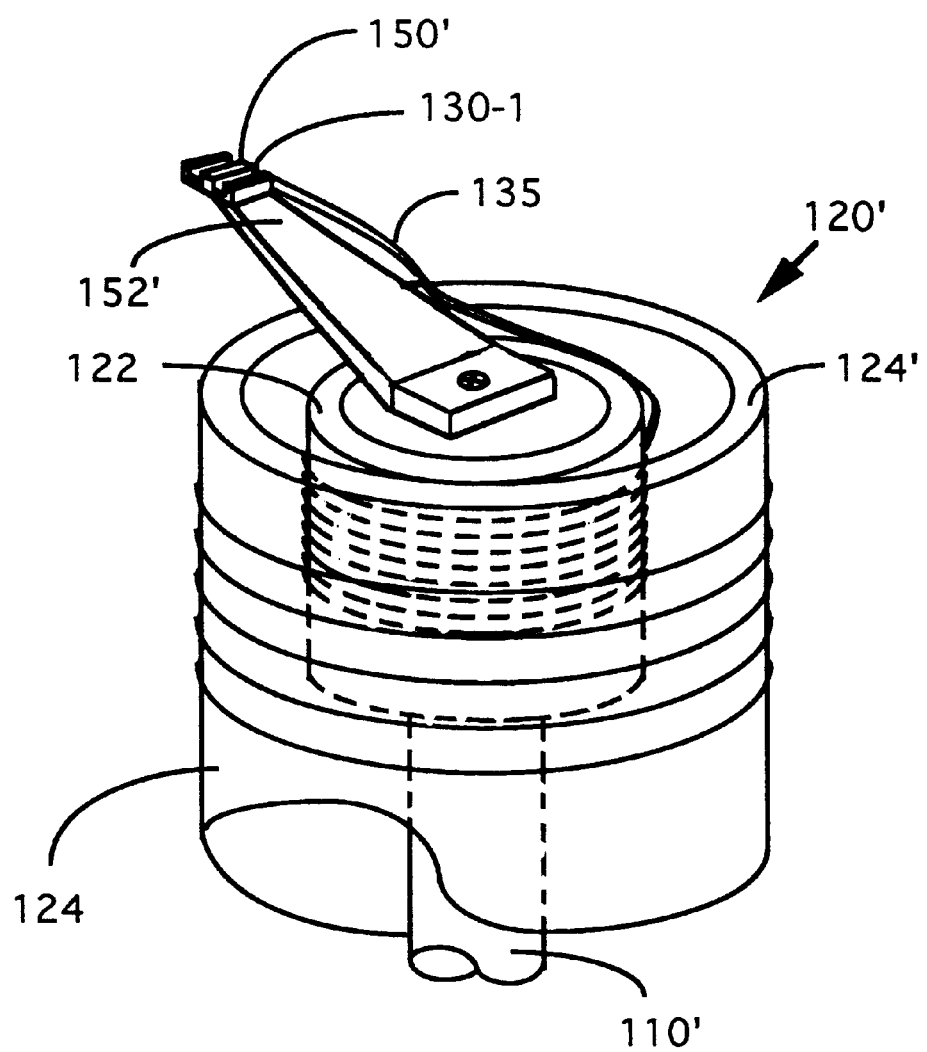
FIG. 1E shows a perspective view of the pickup head and the wires winding configuration serving as read/write data signal transformer.
Figures 1F, 1G:
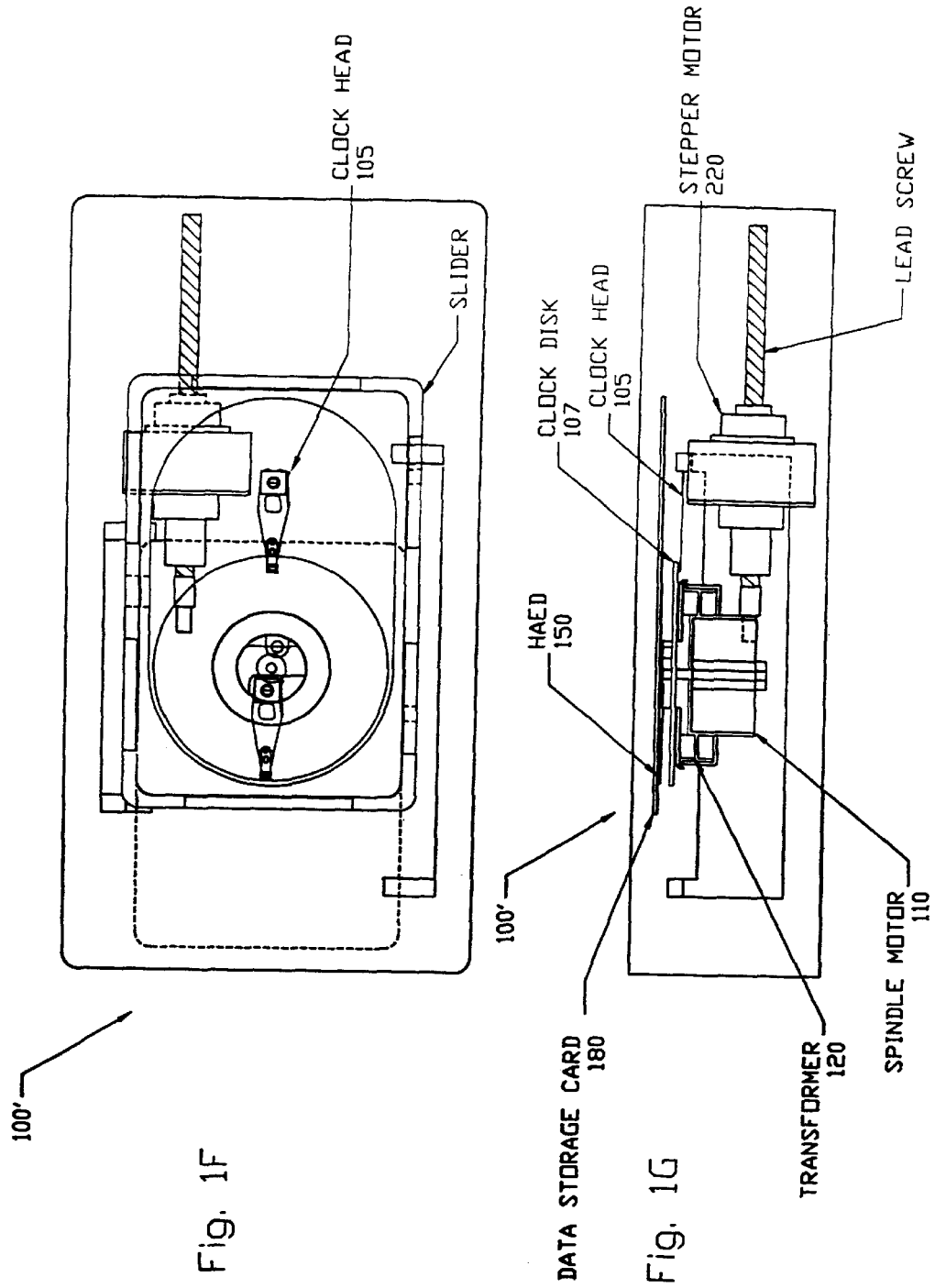
FIGS. 1F and 1G show the top view and cross sectional view respectively of a magnetic or optical servo writer of this invention.

FIGS. 1F and 1G are a top view and a cross sectional view of a preferred embodiment of a data-card servo writer system 100', which has a clock head 105 connected to a clock disk 107. The clock disk 107 is disposed below the magnetic or optical data card 180 and de-coupled from the data card 180. The motor drives the pickup head 150 also drives the clock disk 107. The clock disk can be rotated while the clock head 105 is fixed and stationary and mounted on the frame assembly of the servo writer system 100'. The clock head 105 is employed to write clock signals, e.g., a binary bit 1 for the whole cycle. All of the data bits on the entire data track of the clock track are binary bit "1". Then, a pulse is stopped to write a binary bit "0" to provide that "0" as index while using all the bit "1" for timing to format the card. Read and write signals of the clock head 105 is transmitted through wires to the clock disk 107 formed on a printed circuit board. The clock head 105 is employed to write the clock signals onto the magnetic or optical clock disk and to read back the signals. The clock signals read back from the magnetic or optical clock disk are used as timing signals to format the card to include the servo patterns to be further described below. Once the magnetic or optical data-card 180 is formatted by the servo-writer system 100', it is ready for data read/write operations by applying a regular magnetic or optical data-card drive system as that shown in FIGS. 1A to 1E. The formatted sectors on the magnetic or optical data-card 180 are also write-protected to prevent incidental writing over these segments.

According to FIGS. 1A, 1B, 1C and 1D and above descriptions, the present invention discloses a data-card drive system 100 the present invention includes a magnetic or optical data-card drive system. The drive system includes a magnetic or optical pickup head for rotationally moving over and accessing data stored in the magnetic or optical data-card. In a preferred embodiment, the magnetic or optical pickup head is provided for reading data from and writing data to the magnetic or optical data card. In another preferred embodiment, the magnetic or optical pickup head is provided for accessing data over substantially one-half of the rotational movement. In another preferred embodiment, the magnetic or optical pickup head is provided for accessing data over several arc-segments during the rotational movement. In another preferred embodiment, the magnetic or optical pickup head is provided for rotating in a single rotational direction. In another preferred embodiment, the magnetic or optical pickup head is provided for rotating in clockwise and counterclockwise directions. In another preferred embodiment, the magnetic or optical pickup head is provided for rotating over arc segment having radius smaller than half-width of the magnetic or optical data card. In another preferred embodiment, the magnetic or optical pickup head is provided for rotating over an arc segment having a radius greater than half-width of the magnetic or optical data card. In another preferred embodiment, the magnetic or optical pickup head is provided as a removable and replaceable module. In another preferred embodiment, the magnetic or optical pickup head is provided for accessing data by contacting the magnetic or optical data card. In another preferred embodiment, the magnetic or optical pickup head is provided for accessing data by rotating at a distance above the magnetic or optical data card. In another preferred embodiment, the magnetic or optical data-card drive system of further includes a motor that has a rotating shaft for mounting and rotating the magnetic or optical pickup head. In another preferred embodiment, the magnetic or optical pickup head further includes a data signal transformer for transforming a data signal through data signal induced changes of magnetic flux.

FIG. 1E is a perspective view of an alternate configuration of a data signal transformer 120'. The data signal wires 130-1 connected to the pickup head 150' supported on the arm 152' for the pickup head 150' are first winding around an inner signal transforming cylinder 122', which rotates with the rotation shaft or the motor 110'. A stationary hollow pipe 124' is placed around the inner signal-transforming cylinder 122'. A set of signal transforming wires wrap around this stationary hollow pipe 124'. For read/write data, an electric signal representing a binary bit can be transferred from a pickup head 150' through the wires 135' to the wires wrapping around the inner signal-transforming cylinder 122'. The electric signals, typically an electric pulse, transferred to the wires around the inner cylinder 122' can be detected with variations of electromagnetic field by a set of wires wrapping around the stationary hollow pipe 124'. Similarly, the data signal for the pickup head 150' can also be provided to the wires wrapping around the stationary hollow pipe 124' as electric pulses and detected by the wires wrapping around the inner signal transforming cylinder 122' for transfer to the pickup head 150'. The wires around the inner and outer cylindrical pipes function as inductive coils serving the function of data signal transformation.

Figure 2A:
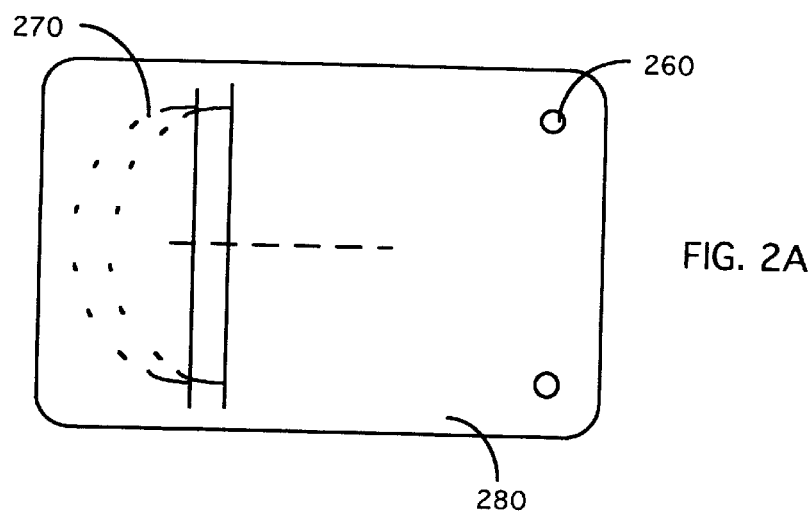
FIGS. 2A to 2C are respectively a top view, a cross sectional view and a bottom view of a data storage card with data tracks formed for storing bits with uniform density in each of these data tracks.
Figure 2B:
Figure 2C:
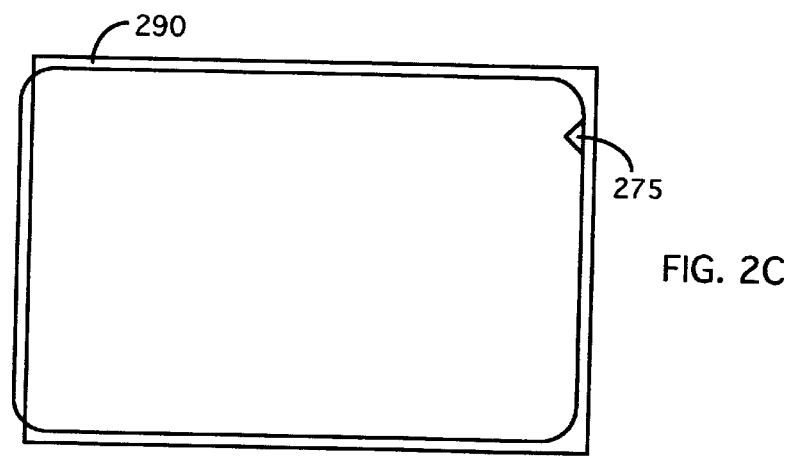

FIGS. 2A to 2C are respectively a top view, a cross sectional view, and a bottom view of a data card 180 of the present invention. The data card 180 is formed on a substrate plate 250. The substrate-plate 250 for magnetic recording is composed of non-magnetizable materials with a flat surface, e.g., a plastic or glass substrate plate. For magnetic recording, a magnetizable material can also be employed to form the substrate plate 250. The substrate plate 250 is then coated with a thin layer of recording medium on one side or both sides. For magnetic recording, the coating are formed by magnetic particles coated on one-side or both sides of the substrate plate 250. The magnetic coating can be directly on the surface of the substrate plate 250 or on a Mylar type of material with adhesive layer for attaching to the substrate plate 250. For magnetic recording the recording medium layer can be formed by a process similar to that of a magnetic compact-disk (CD), CDR, LD, or digital video display (DVD) disks. The data card 180 can be formed with standardized sizes, e.g., PCMCIA standard sizes or standard credit card sizes, and has round or elongated holes 260 for fixing the card at pre-designated positions to initialize a data access operation. The holes 260 are fitted to the pins 190 to provide the self-centering and locking functions. The data storage card 280 can therefore be repeatedly placed at a pre-designated position with reliable accuracy. The data card 180 is provided with a plurality of data tracks 270 for storing data bit on each track. Each of these data tracks is formed as substantially an arc or arc-segments track. The data tracks 270 are substantially of a same length and are substantially parallel to each other. The data tracks 270 are formatted to include multiple sectors. One or several of these sectors can be flexibly employed to provide servo data for the purpose of identifying track locations to enhance sector seeking during a data-access operation. The servo-data are provided in sectors near both ends of the arc or arc-segments data tracks 270 as shown in FIG. 2A. For the purpose of more precisely positioning the data card 180 in a drive device, a notch 275 is formed near the inner end of the data card 180. With the notch 275, the data card 180 is more conveniently placed into the drive device fitted to the initial card position ready for operation relative to the position of the pickup head 150. The data card 180 is then covered by a protective coating 280 preventing damages from exposure to water, dust and other foreign particles introduced through the daily operational environment. The data card 180 is then stored in a data card envelop 290 for storage and shipment. The data storage tracks of the data card may contain user application and system configuration data. The recorded data can be updated in the field. Application system can either encrypt or decrypt the recorded data. Application system can also change the configuration such as set and reset the write protection, the password and other features related to the data-access operations.

Figure 2D:
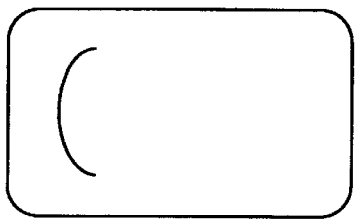
FIGS. 2D to 2Q show the top views of the data storage card of this invention where the data tracks can be arranged in arc-segments of different shapes, sizes, and facing different directions.
Figure 2E:
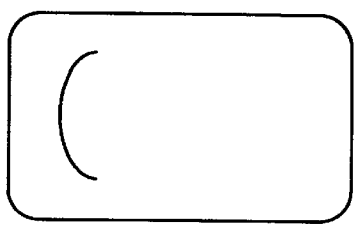
Figure 2F:
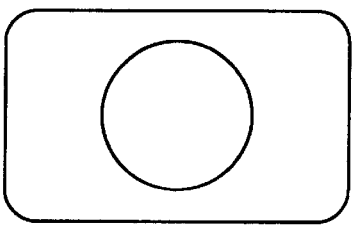
Figure 2G:
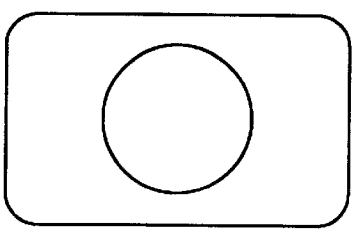
Figure 2H:
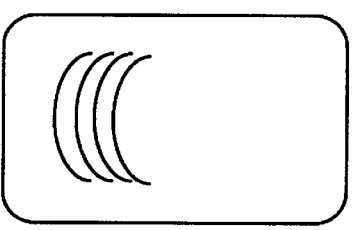
Figure 2I:
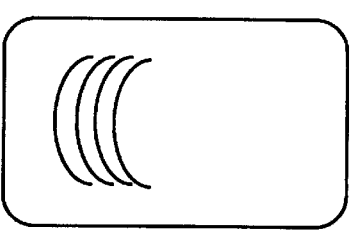
Figure 2J:
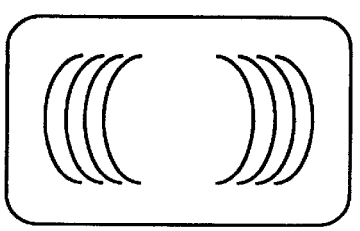
Figure 2K:
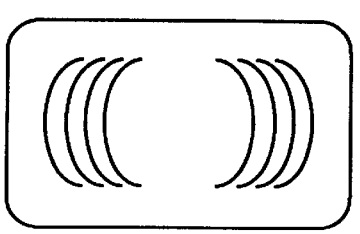
Figure 2L:
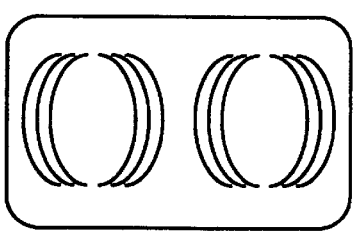
Figure 2M:
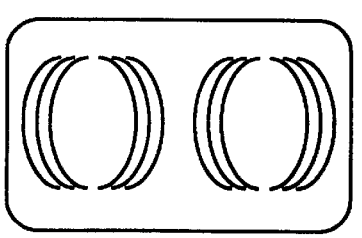
Figure 2N:
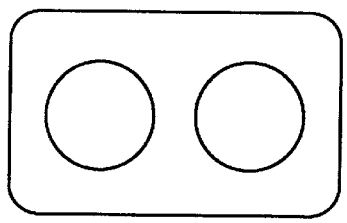
Figure 2O:
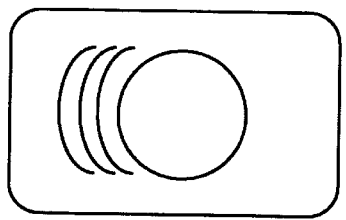
Figure 2P:
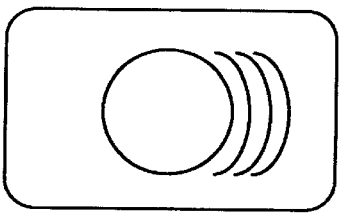
Figure 2Q:
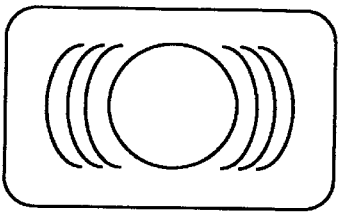

FIGS. 2D to 2Q are top views of the data storage card 180 for showing different configuration of the data tracks 270. The data tracks 270-1 can be parallel arcs facing opposite directions on either side of the data card 180 as shown in FIG. 2D. Alternately, each of the data tracks 270-1 as parallel arc as that shown in FIG. 2D can be partitioned into a plurality of arc-segment 270-2 as that shown in FIG. 2E. In a similar manner, the data tracks can be parallel arcs 270-3 formed over the entire data card area as that shown in FIG. 2F. Furthermore, each of the parallel arcs 270-3 of FIG. 2F can also be partitioned into a plurality of arc segments 270-4 as that shown in FIG. 2G.

According to FIGS. 1 to 2, this invention discloses a magnetic or optical data-storage card. The magnetic or optical data-storage card includes a magnetic or optical data-storage medium layer supported on the card. The data-storage medium layer includes a plurality of data storage tracks for storing data therein. Each of the tracks comprising at least an arc-segment wherein each of the data storage track being substantially parallel to a neighboring track. In a preferred embodiment, each of the arc-segments are substantially of a same segment length. In a preferred embodiment, the data-storage tracks further storing servo control data. In a preferred embodiment, the data-storage tracks further storing the servo-control data at a substantially same relative position on the data-storage tracks. In another preferred embodiment, the data-storage tracks further storing the servo-control data near edges of the data-storage card on the data-storage tracks. In another preferred embodiment, each of the data-storage tracks is substantially a semicircular arc-segment. In another preferred embodiment, each of the data-storage tracks includes several arc segments. In another preferred embodiment, the magnetic or optical data-storage card further includes self-positioning guiding means for guiding the card to a loading position when inserted into a data card drive device. In another preferred embodiment, the magnetic or optical data storage card having a first side and a second side and the data-storage tracks are disposed on the first and second sides. In another preferred embodiment, the magnetic or optical data storage further includes a card jacket for storing the data storage card.

Furthermore, this invention provides a new method for storing data in a magnetic or optical data-storage card. The method includes the steps of a) providing a magnetic or optical data-storage medium layer supported on the data-storage card. And, b) forming in the data-storage medium layer a plurality of data storage tracks for storing data therein by forming each of the tracks to include at least an arc-segment and each of the data storage tracks substantially parallel to a neighboring track. In a preferred embodiment, the step of forming the data-storage tracks as arc segments is a step of forming each of the arc segments substantially of a same segment length. In another preferred embodiment, the method further includes a step of storing servo control data in the data-storage tracks. In another preferred embodiment, the step of storing the servo-control data is a step of storing the servo-control data at a substantially same relative position on the data-storage tracks. In another preferred embodiment, the step of storing the servo-control data is a step of storing the servo-control data near edges of the data-storage card on the data-storage tracks. In another preferred embodiment, the step of forming the data-storage to include at least an arc segment is a step of forming each of the data-storage tracks substantially as a semicircular arc-segment. In another preferred embodiment, the step of forming the data-storage to include at least an arc segment is a step of forming each of the data-storage tracks to include several arc segments. In another preferred embodiment, the method further includes a step of providing a self-positioning guiding means for guiding the magnetic or optical data-storage card to a loading position when inserted into a data card drive device. In another preferred embodiment, the step of providing a magnetic or optical data-storage medium layer supported on the card is a step of providing the magnetic or optical data storage card to include a first side and a second side. And, the step of forming in the data-storage medium layer a plurality of data storage tracks is a step of forming the data-storage tracks on the first and second sides. In another preferred embodiment, the method further includes a step of providing a card jacket for storing the data storage card.

Figure 3A:
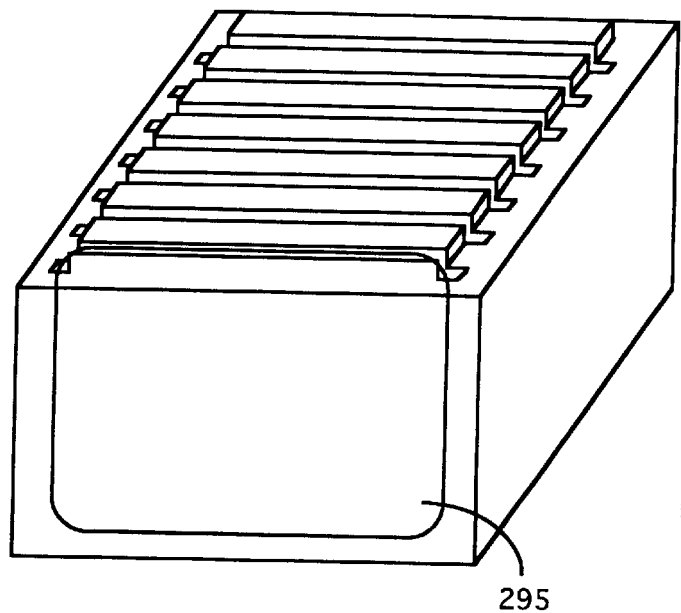
FIGS. 3A and 3B are a perspective view and a cross sectional view respectively of a data card storage box.
Figure 3B:
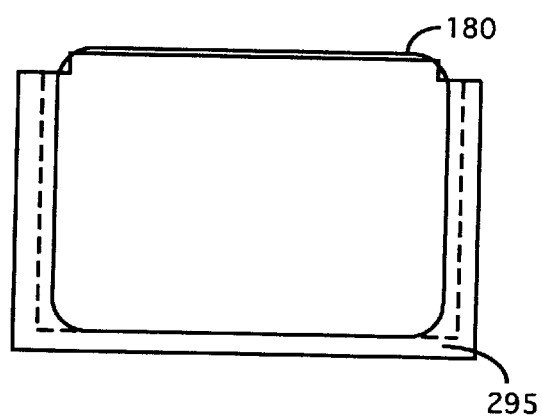

FIGS. 3A and 3B are a perspective view and a side view of a data card storage rack 295 for storing a plurality of data card 180 therein. The data card storage rack 295 as shown can be formed as partitioned storage box with each compartment ready to receive one data card 180. The data card storage rack 295 can function as a portable digital camera album or a backup data store for long term data storage.

Figure 4:
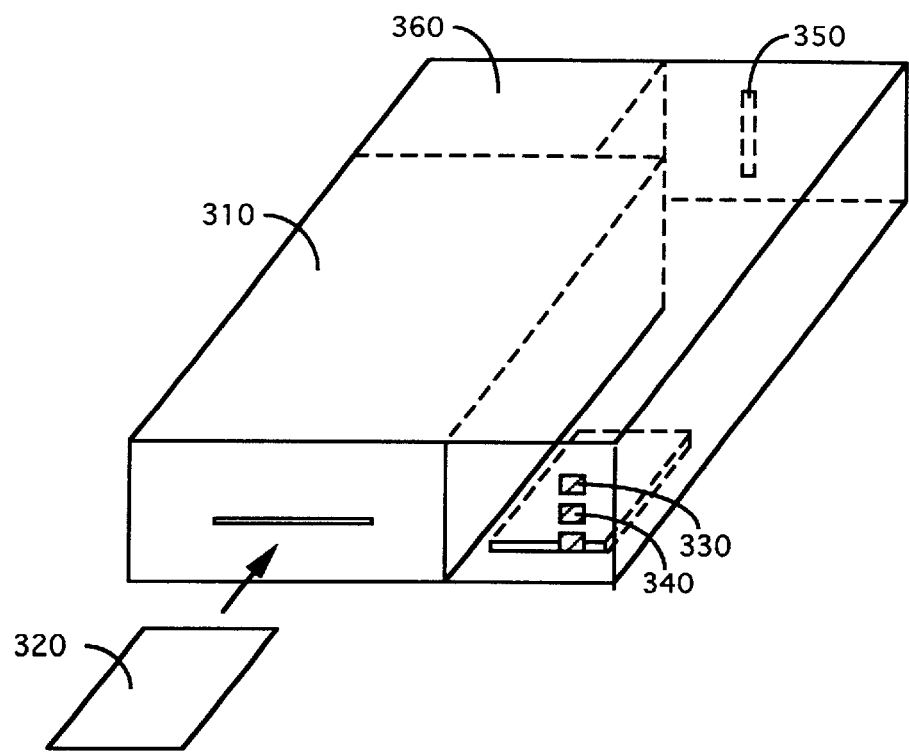
FIG. 4 is a functional block diagram of a subsystem of this invention includes a data card drive device of FIGS. 1A to 1C for reading/writing data storage card of FIGS. 2A to 2C.

FIG. 4 shows a subsystem 300 of this invention that includes a data card drive device 310 identical with the drive device 100 described above according to FIGS. 1A to 1C. The disk drive device 310 performs the data access tasks on a data storage card 320 identical to the data card 180 described above according to FIGS. 2A to 2C. The subsystem 300 further includes a local memory 330, which can be a DRAM or SRAM memory device connected to the disk drive device 310. The data stored in data card 320 can be first down loaded to the memory device 330 through a data bus for data storage. The subsystem 300 further includes a function control panel 340 to allow a user to control the subsystem startup, shutdown, save, update, and duplication of the data stored in the card. The subsystem 300 is further provided with a connection terminal 350 for connection to a personal computer, a printer, a scanner or other peripheral devices for operation together with the drive device subsystem 300. A power supply 360 is employed and connected to the subsystem 300 to provide power necessary for operating the drive device 310, the memory 340 and the control panel 330.

Figure 5A:
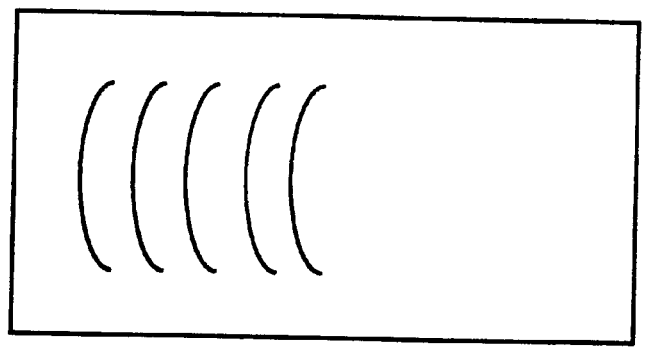
FIGS. 5A and 5B show the data tracks on a magnetic or optical data card with data tracks for writing servo data thereon.
Figure 5B:
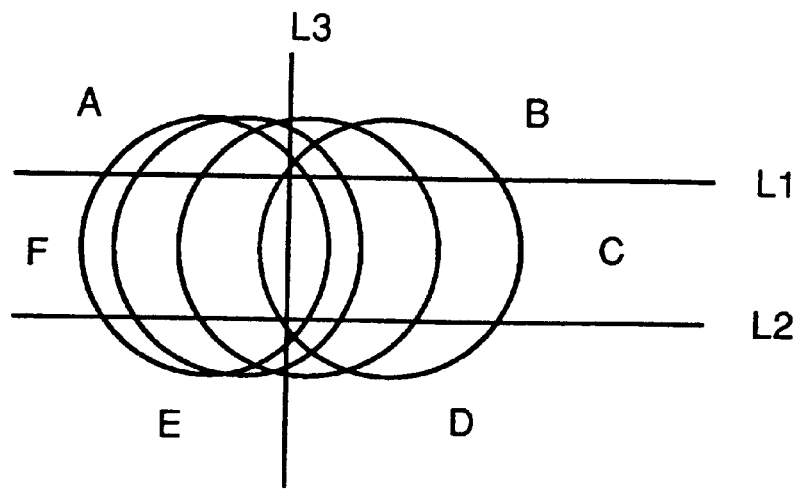
Figures 5C, 5D:
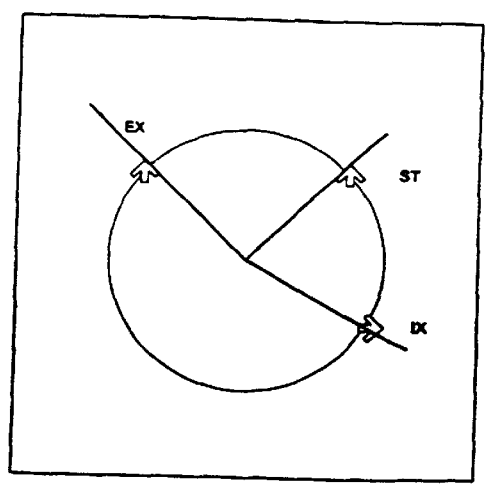
FIG. 5C shows an exemplary pattern of servo data written onto a data track.
FIG. 5D shows the position indexes for servo control.

Referring to FIGS. 5A to 5C for examples to illustrate the servo signal patterns written onto the arc segments of the data-storage tracks on a data storage card. FIG. 5A shows the data storage tracks as arc segments, which may or may not be circular arcs. The servo writer must write servo signals on these data-tracks. Referring to FIG. 5B, the surface area of the magnetic or optical data-storage card is divided into zones A to F according to clockwise direction. The servo writer should be disabled for Zones A, B, D, and E since these zones are not part of the data tracks. The servo writer must also be disabled in zone E because the servo data may be overlapped and create confusions in the process of pickup head location and track determinations. It is obvious the conventional servo writer and control mechanisms can no longer be employed for the magnetic or optical data card drive system of this invention.

As shown in FIG. 5A, the length of the data tracks depends on the size and dimensions of the data card. Each data track is divided into N segments and each segment is provided to contain pre-defined servo data, prerecorded data and/or definitions of area for data records. FIG. 5C is an example of the data arrangements across the tracks of such segment. The total number of data tracks N is determined by the requirements of the accuracy of the mechanical and electrical responses. The servo data shown in FIG. 5C can provide the track profile, the location of the track and the relative location of signal pickup head to a data track along a track.

Referring to the details of data arrangement shown in FIG. 5C, the signals generated from data bit-patterns A and B are for position determination. Each data track has a half data slots provided for A and half of the slots provided for B. The balance of A and B detected by the pickup head and the track location determination circuits provide indications that the pickup head is traveling in the center of the data track. Table 1 shows the data sample employed for providing servo data for track and location determinations as the pickup head is traveling over the surface of the magnetic or optical data storage card.

TABLE 1

Example of Partial Servo Segment Data

| | | |
|---|---|---|
| SYNC | 1010101010101010 | |
| ADM | 1000000010000001 | |
| ST IDX | 11 for First Segment | 00 for other segments |
| ED IDX | 11 for last segment | 00 for other segments |
| A | 0000001100000000 | |
| B | 0000000000000011 | |

Referring to FIG. 5D, since the data track can only be arc-segments as that shown FIG. 5A, the servo writer must start and stop to layout patterns at pre-determined locations. An index is used as a reference point at a fixed location on the magnetic or optical data-storage card. The starting point SX and the stopping position EX of the servo data are derived from the reference point IX as shown in FIG. 5D. A servo control circuit is employed to enable and disable the pattern layout process and to move the magnetic or optical pickup head and the flat data-storage medium, i.e., the magnetic or optical data storage card by using the feedback by detecting these three indices. An exemplary functional block diagram for implementing the control logic in the servo control circuit is shown in FIG. 5E.

According to FIGS. 5A to 5E, this invention discloses a magnetic or optical servo writer. The magnetic or optical servo writer includes a magnetic or optical pickup head for rotationally moving over and writing servo data in a magnetic or optical flat data-storage medium. The magnetic or optical servo writer further includes a clock head for providing clock signals to the pickup head and to write clock signals in the clock disk. The magnetic or optical pickup head is provided for writing SYNC data for synchronization of read channel, and ADM data for providing address mark for indicating data-types following the ADM data. The magnetic or optical pickup head is provided for writing ST IDX data for indicating a first valid data segment, ED IDX data for indicating a last valid data segment, and GRAY CODE data for indicating a head number, a sector number, and a track number. Furthermore, the magnetic or optical pickup head is provided for writing SERVO POS data for indicating a relative position of signal head to a data track, DATA & GAP data for indicating an area for containing pre-recorded data. In a preferred embodiment, the magnetic or optical pickup head is provided for writing index data for indicating a valid data track segment.

Figure 5E:
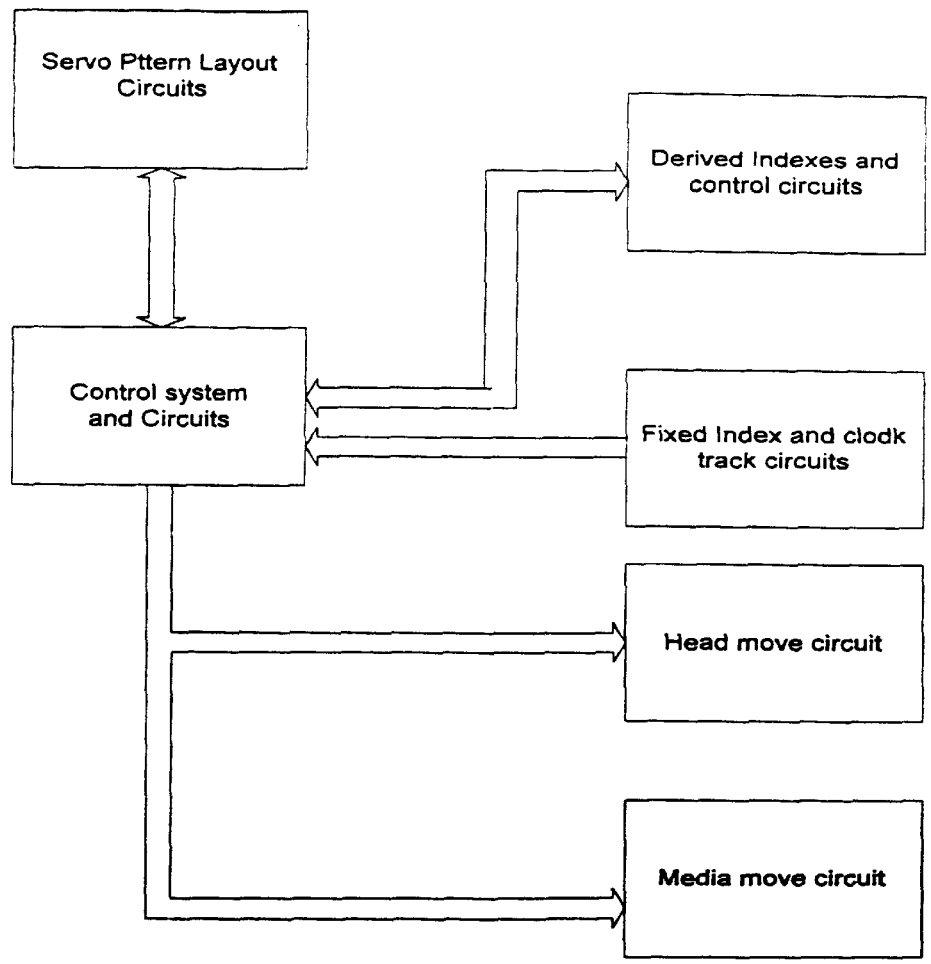
FIG. 5E is a functional block diagram to illustrate the control logic implementation of a servo writer of this invention.

According to the functional block diagram of FIG. 5E and FIGS. 1F and 1G, a magnetic or optical servo writer is disclosed in this invention. The magnetic or optical servo writer includes a magnetic or optical pickup head for rotationally moving over and writing servo data in a magnetic or optical flat data-storage medium. The magnetic or optical servo writer further includes a clock head for providing clock signals to the clock head and to write clock signals in the magnetic or optical clock disk. The magnetic or optical servo writer further includes a control circuit for controlling the magnetic or optical pickup head for writing the servo data on the magnetic or optical flat data-storage medium. The magnetic or optical servo writer further includes a servo pattern layout circuit for controlling the magnetic or optical pickup head for writing the servo data on the magnetic or optical flat data-storage medium with predefined servo patterns. The magnetic or optical servo writer further includes a derived index control circuit for deriving indices from a fixed index provided on the magnetic or optical flat data-storage medium. The magnetic or optical servo writer further includes a fixed index and clock track circuit for providing a fix index and a clock signal for controlling the magnetic or optical pickup head for writing the servo data on the magnetic or optical flat data-storage medium. The magnetic or optical servo writer further includes a head move circuit for controlling a movement of the magnetic or optical pickup head for writing the servo data on the magnetic or optical flat data-storage medium. The magnetic or optical servo writer further includes a medium movement circuit for controlling a linear movement of the magnetic or optical flat data-storage medium for writing the servo data on the magnetic or optical flat data-storage medium.

Figures 6A, 6B:
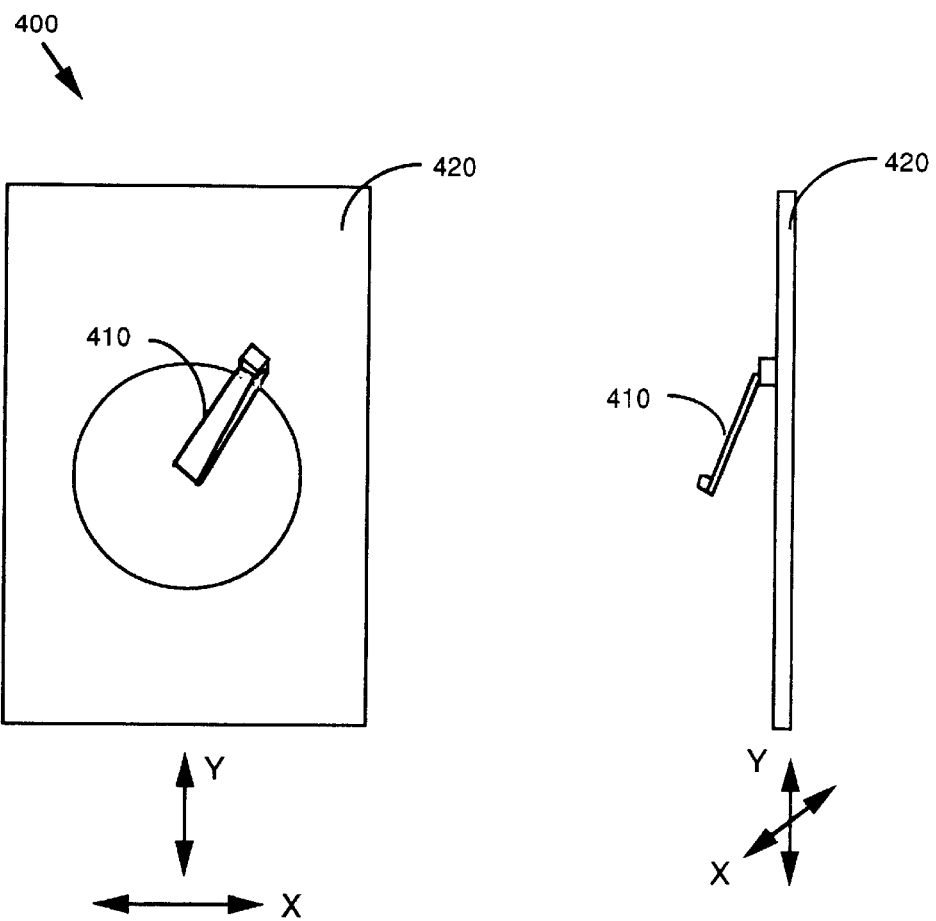
FIGS. 6A and 6B are top view and cross sectional view of a rotating head data device provided with X-Y table for moving a flat media.
Figure 7:
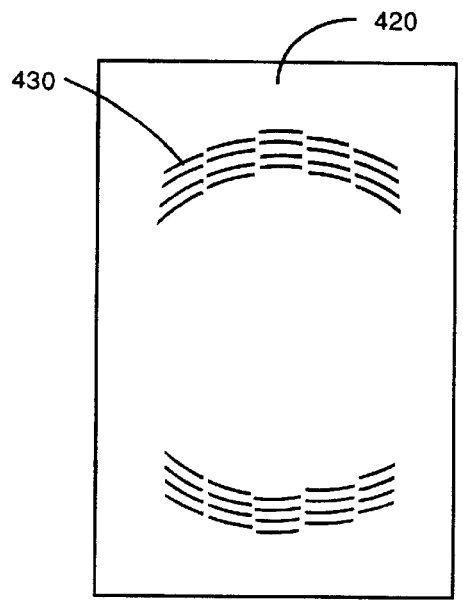
FIG. 7 shows a general group of data segments recorded onto the flat media.
Figure 8:
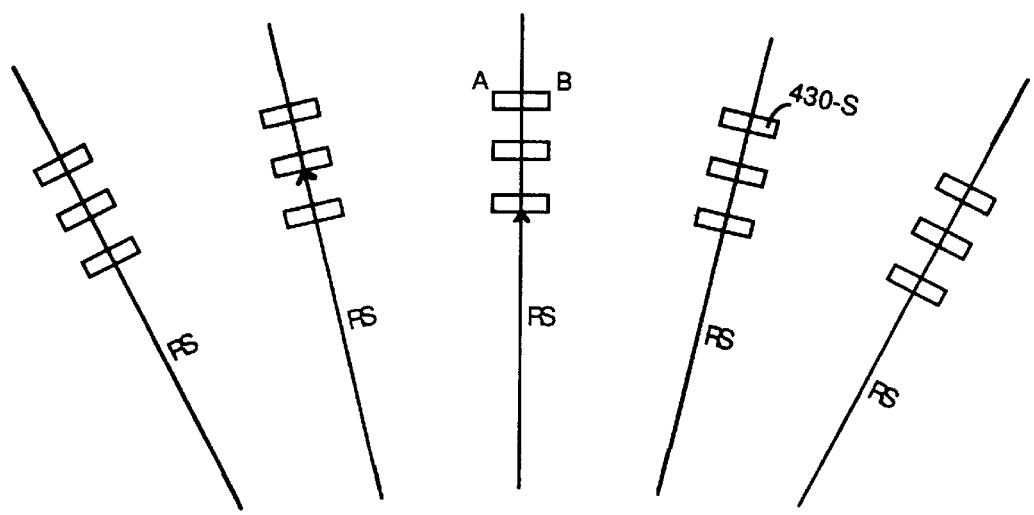
FIG. 8 shows some of the servo segments by a servo writer similar to the device as FIG. 6.
Figure 9A:
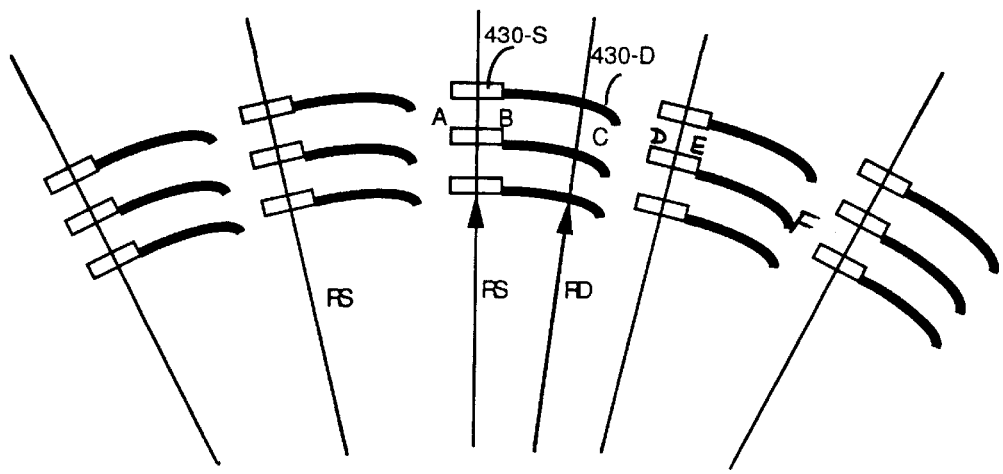
FIG. 9 shows the addition of data segment added to the servo segment by a rotating head device described in FIG. 6.
Figure 9B:
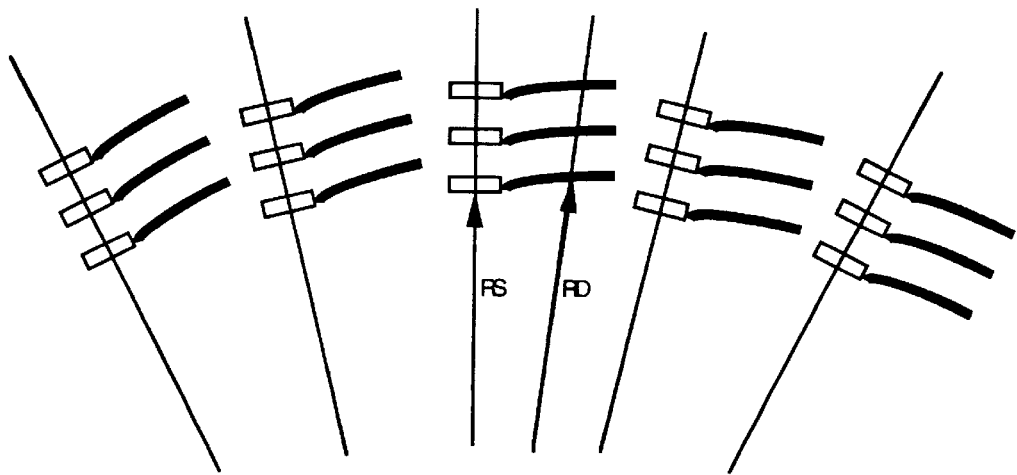

Referring to FIGS. 6A and 6B for a top view and a side view of a data access device 400 with a rotating pickup head 410 rotating above a data card 420. The data card 420 has a flat medium surface that is moved in X and Y directions driven by a pair of step motors. The rotating head 410 has a dynamic head loader to engage the signal pickup head 410 to or move the pickup head away from the flat media 410 for data access. In order to over the difficulties generated by stepping motor discrete movements, the data track segments 430, as shown in FIG. 7, are formed as stepwise, discrete, and non-continuous segments 430 wherein each segment is substantially a segmented circular curve. Each of two neighboring curved segments is disposed with a small displacement from each other. FIG. 8 shows some of the servo segments 430-S by a servo writer similar to the device as FIG. 6. The radius of the servo writer rotating head arm is RS and the data card 420 is moved laterally for the servo writer to write the servo sectors 430-S as shown. FIG. 9A shows the addition of data segment 430-D added to the servo segment by a rotating head device described in FIG. 6. The radius of rotating head arm is RD in this device. As the RD is smaller than the RS, the data segment 430-D has a curvature shift starting at the end of servo sector. FIG. 9B shows a configuration that RD is larger than the RS, the curvature shift is at opposite direction showed in FIG. 9A. Such track segment arrangements are made for the purpose for easily interchanging different data cards for operation by different data card reader/writer units wherein each data card has servo sectors written by different servo writers. Furthermore, with a predefined arrangement made as that shown in either FIGS. 9A or 9B, the configurations can be conveniently controlled to have a curvature shift that is always bias at one direction with a longer or a shorter arm radius. For example when an arrangement can be made to have RD always less than RS and the data segment is downwardly curved as that depicted in FIG. 9A.

Figure 10A:
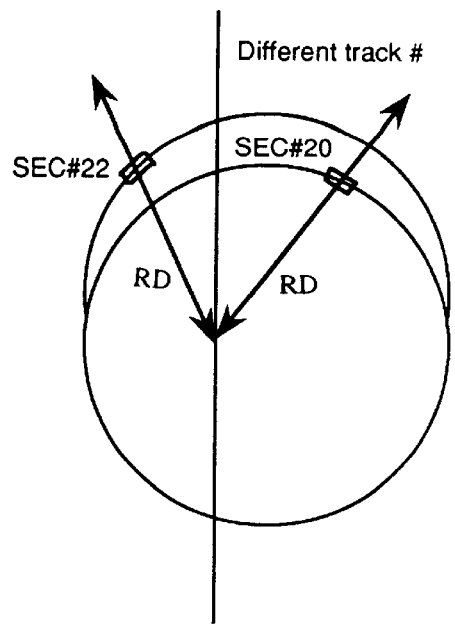
FIGS. 10A and 10B shows the servo segments used for centering a data card relative to a pickup head before a profile calibration process is carried out.
Figure 10B:
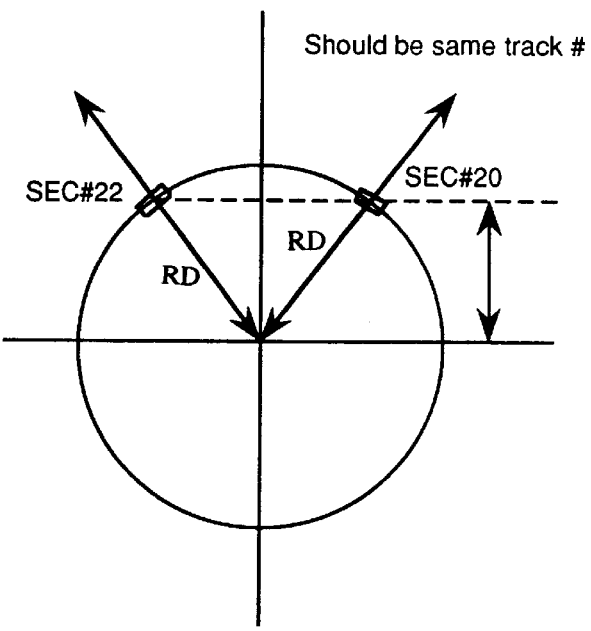

With the stepwise discrete data-track segments formed on a flat medium for servo and data storage, the X-Y table and the rotating pickup head must be calibrated in order to precisely and timely position the pickup head on designated sectors of different tracks to carry out a data access operation. A first operation is to center the flat medium, e.g., a data card, relative to the circular motion of the pickup head. Referring to FIGS. 10A and 10B for the centering operation where a pickup head rotates over a circular track to read the servo data of a first segment and a last segment or any two equal center distance straddle segments. The data obtained from these two segments are employed for identifying the track numbers defined by the first and the last segment of the track or the selected two equal center distance straddle segments. As shown in FIG. 10A, when the track number read from the first servo segment is different from the last servo segment or the two selected equal center distance straddle segments, the X-Y table is moved by a stepping motor action under the control of a controller. The movement of the X-Y table is to center the data card relative to the pickup head such that the first and last servo segments or the two selected equal center distance straddle segments provide the same track number shown in FIG. 10B. The amount of adjustment to centering the flat media relative to the rotating center of rotating head can be related to the offset of the two straddle-sector segments. The discrete adjustment as that shown in FIG. 12B with a relation between offset OF and sector location difference DE can be represented by equation, $$DE = RD(\operatorname{Sin} A - \operatorname{Sin}(\operatorname{Cos}-1(\operatorname{Cos} A + OF/RD)))$$

Figure 11:
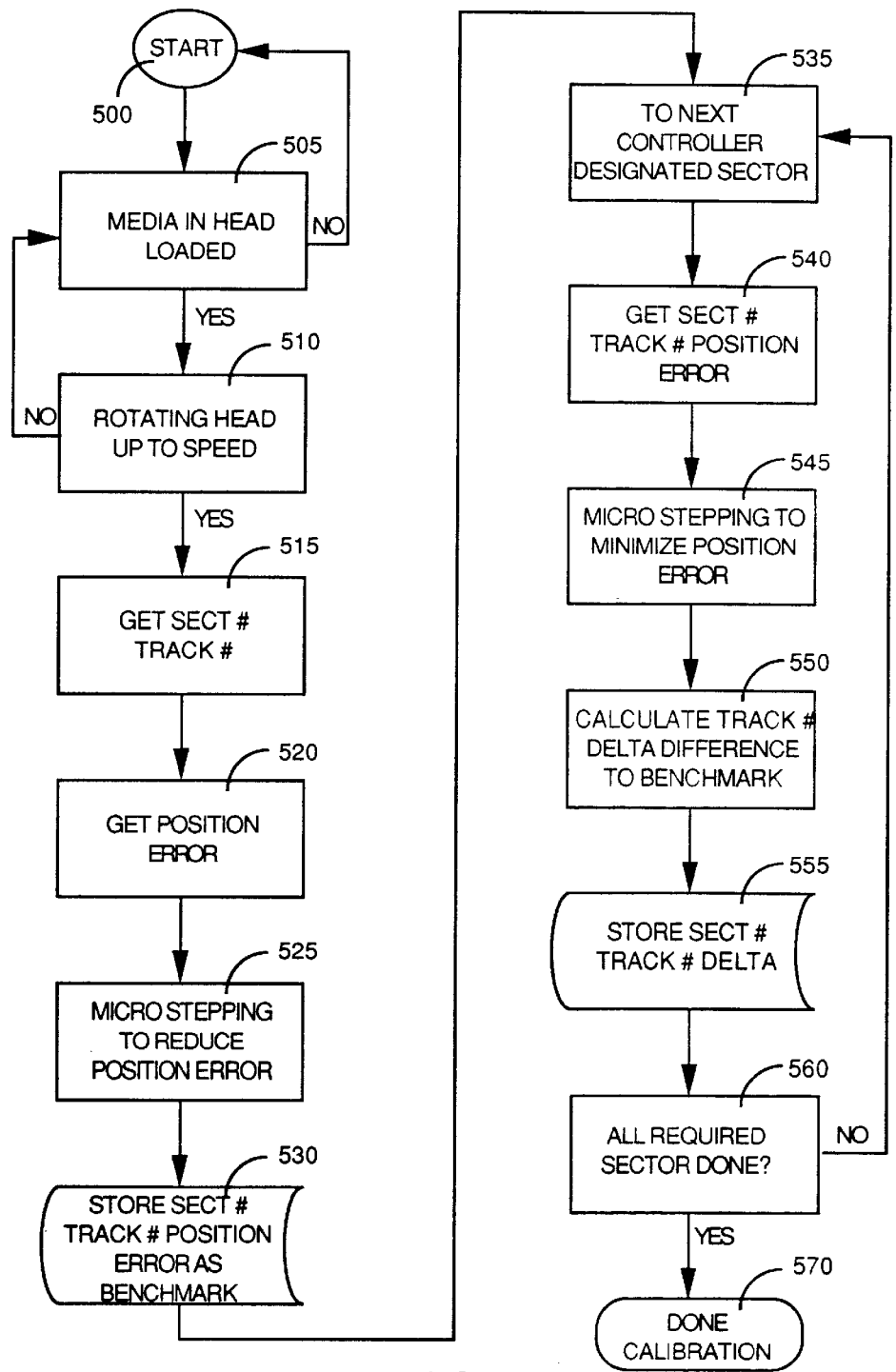
FIG. 11 is a flow chart for showing the steps for performing a profile calibration.

After the centering process is completed, a profile calibration is then carried out as that shown in FIG. 11. The profile calibration starts (step 500) by first checking if the flat medium, e.g., a data card, is inserted and the pickup head is loaded (step 505), and the checks performed in step 505 is repeated if the conditions are not satisfied. When the data card is properly in place and the pickup head is loaded, then a check is carried out to determine if the pickup head is rotating up to proper rotating speed (step 510) and repeating the check of step 610 if it is not. When the pickup head is rotating at a specified rotational speed, the pickup head is commanded by a controller, coordinated with the movement of the data card by the X-Y table, to move to a selected sector of a selected track (step 515). The pickup head read servo data from the servo segment of the selected sector as designated by point A to point B as that illustrated in FIGS. 9A and 9B. A position error is determined from the data read from the servo segment (step 520), then the stepping motor is controlled to move the X-Y table to reduce the position error (step 525). One example of such operation is to reduce the difference of the A-B signals such that the pickup head rotation is basically symmetrical relative to points A to B when the pickup head rotating over the servo segment. The sector and track number together with the position error are recorded and stored in a database by the device commander (step 530) for controlling the reading of the servo data from the servo segment. A closed loop control scheme is employed in reading and correcting the position errors during the retrieval of the servo data from the servo segment. This first reading of sector and track number is set as a reference sector.

The process then proceeds with the X-Y table moving the data card in coordination with the pickup head rotating over the data card to read data from a next sector (step 535), to determine a sector number and the position error (step 540). Again, by controlling the micro-stepping process of the stepping motor using a closed-loop control scheme, the X-Y table is moved to reduce the position error (step 545). Using the data read from the servo segments from multiple sectors, a difference of track number between each sector to the reference sector is determined (step 550) and these data are stored in the database (step 555). The processes described from steps 535 to 555 are repeated (step 560) for all the required sectors preferably for at least one complete track, and the calibration sequence is completed (step 570).

Figure 12A:
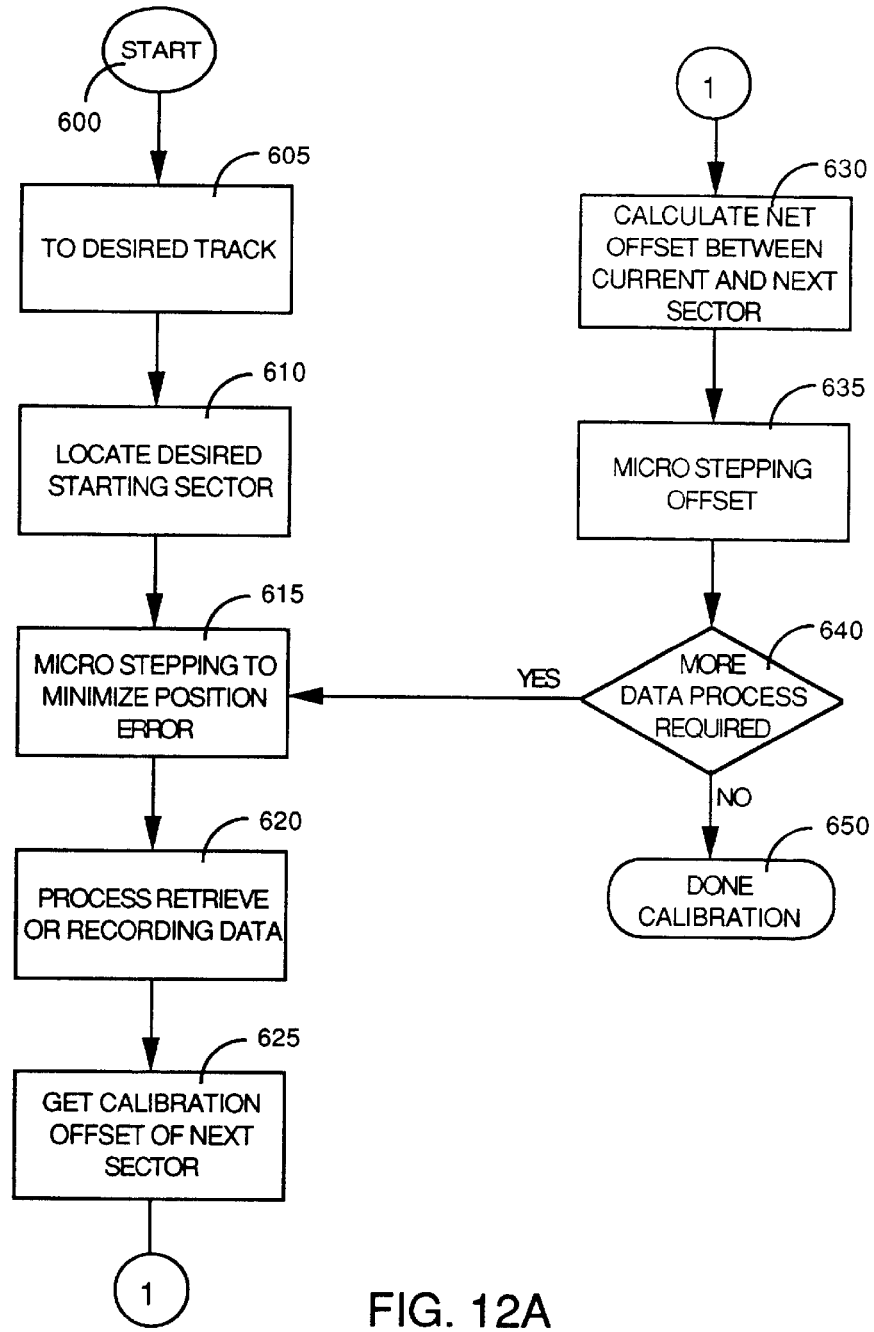
FIG. 12A is a flow chart for showing a sequence of steps applied to access data sectors.

After the profile calibration is completed, any data access operation, as that shown in FIG. 12A, is carried out (step 600) by positioning the pickup head with the movement of flat media (card) in X-Y direction on a selected track (step 605) and to a selected sector with rotating head in the selected track (step 610). The servo data are retrieved from the servo segment of the selected sector and a micro-stepping operation is performed to reduce the position error (step 615) with a closed loop control scheme described in FIG. 11 above. Then an open loop data access operation is performed (step 620) to read data from or write data to the data segment, i.e., segment B–C as that shown in FIG. 9B. After reading/writing data on the data segment B–C, the sector offset data from the database established from the profile calibration operation is used (step 625) to calculate the net offset of the current and next sector (step 630). A micro-stepping operation is performed (step 635) by the stepping motor in moving the X-Y table according to the offset calculated from step 630 to position the pickup head ready for reading data from the next sector. A check is then made to determine if further data access required from more sectors (step 640), to repeat the operations described for steps 615 to 635 when data access to next sector is necessary. The process of data access is completed (step 650) when all the required data access to all the sectors are performed.

Figure 12B:
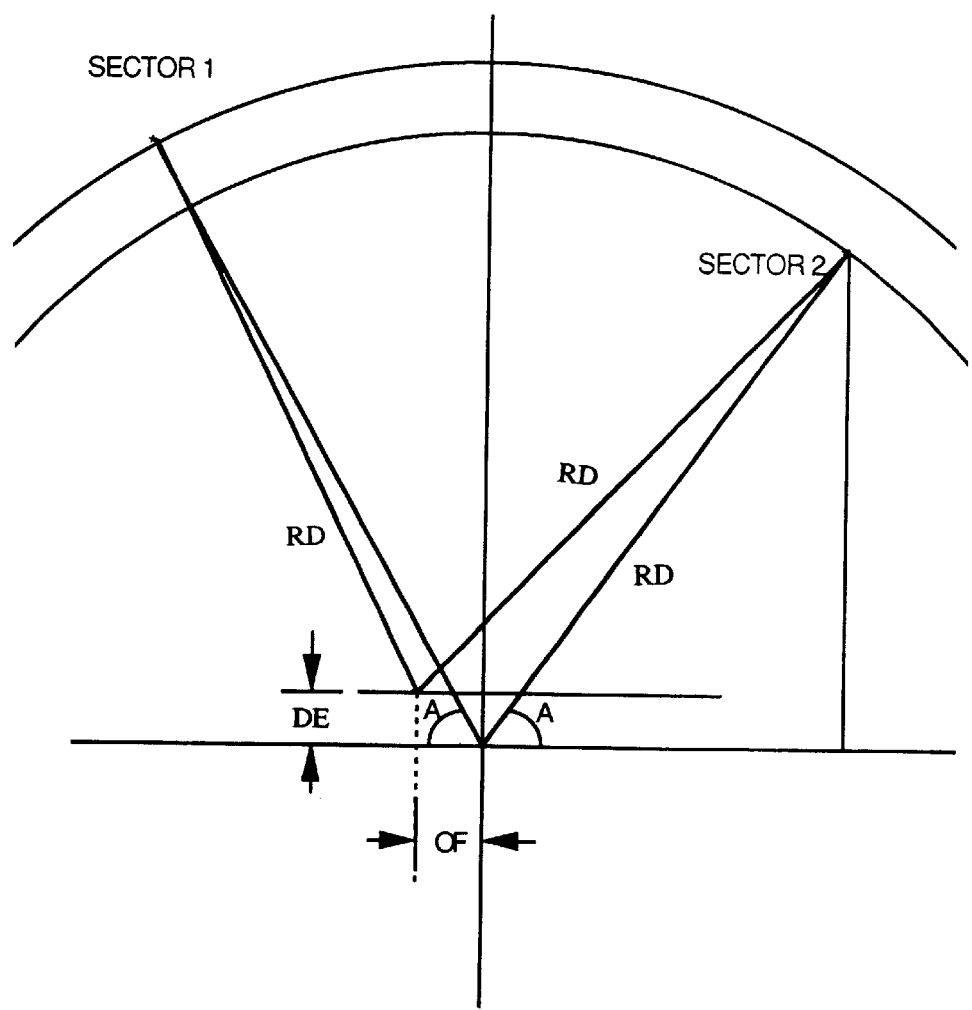
FIG. 12B showing a sector offset between different sectors employed by a controller to access data from different sectors.

Referring to FIG. 12B for an example of the microstepping process to reduce the offset described in steps 630 and 635. Two sectors, e.g., sector 1 and sector 2, are shown and these two sectors have sector offset and axis offset expressed by X-Y displacements DE and DF, and also angular difference of angle A' relative to angle A. These offsets are calculated from the data obtained from the profile calibration for the purpose of micro stepping the X-Y table to position the pickup onto different sectors to properly carry out the data accesses operations.

As a rotating head drive starts up after a flat media is inserted and seated properly, the rotating head sweeps along the servo sectors to check the required micro stepping adjustment in order to reach each desired sector. Referring again to FIG. 9A, the head swings from A to B then B to C. An adjustment must be made since RS and RD has different radiuses. The data device records such adjustment based on data stored in the servo sectors to adjacent servo sector in both circumference and radial directions as a calibration process as FIG. 11A or by a similar sequence. In the data access mode, the pickup head centers along the track by using the servo segment information A–B, the retrieve or record data at B–C at radius RD. Device then makes the adjustment to D–E with gathered offset information during profile calibration time. This adjustment is discrete by the nature of stepping motor that appears as a jump motion.

Figure 13A:
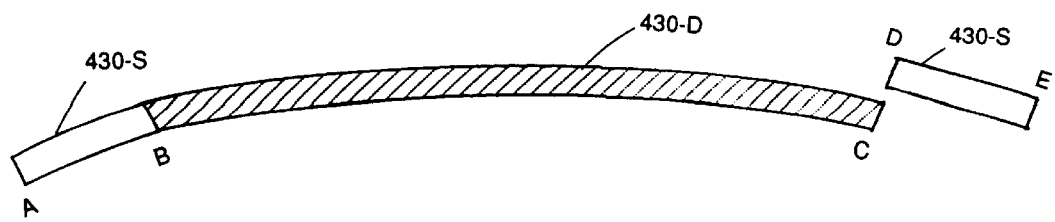
FIG. 13A shows typical servo and data segments of a sector.
Figure 13B:
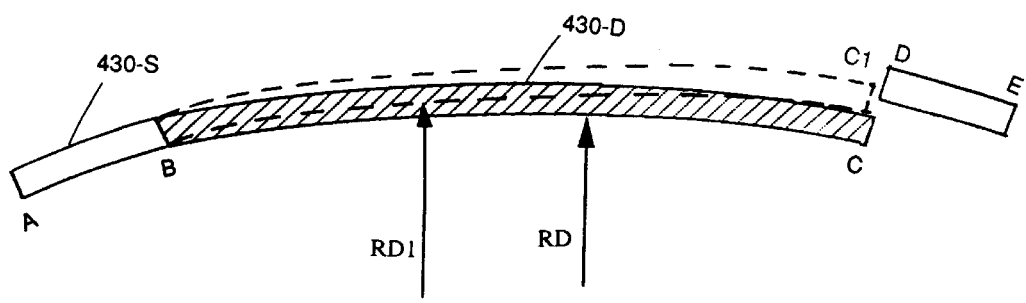
FIG. 13B shows that a head rotates at radius RD1 when reading a servo segment.
Figure 13C:
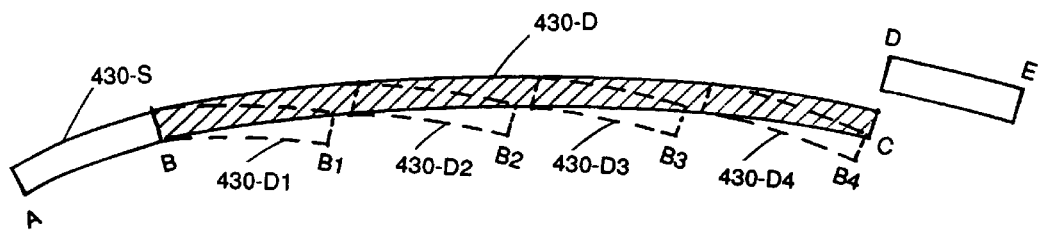
FIG. 13C shows a case where the offset between B and C is subdivided into one or more sub-corrections.

FIG. 13-A again shows a typical servo 430-S and data 430-D segments a sector. FIG. 13-B shows a signal pickup heads with a rotating radius RD1 sweeping at 430-D1 that is different from RD scan over the data segment 430-D. As 430-D and 430-D1 are close within the design tolerance, data in 430-D can be read and re-record as necessary. At the end of 430-D1 point C1, controller must make a adjustment of X-Y table to locate the pickup head to point D. In cases that RD1 is different from RD at a larger value, a sub-correction can be done with the collected database that stored the offset between B and C. FIG. 13-C shows such case that the offset between B and C is subdivided to one or more sub-corrections, the X-Y table is adjusted at one or more locations during the sweep of 430-D as 430-D1, 430-D2, etc. as necessary.

According to above descriptions, this invention discloses a data card that has a plurality of data tracks 430 disposed on a flat data-storage medium 420. Each of the data tracks 430 further includes a plurality of stepwise discrete segments. In a preferred embodiment, each of the segments further includes a servo segment 430-S and a data segment 430-D. In another preferred embodiment, each of the servo segments is substantially a circumference segment of a first circle. And, each of the data segments is substantially a circumference segment of a second circle where the first circle and the second circle have radiuses of different lengths. In a preferred embodiment, the second circle has a substantially equal or slightly shorter radius than the first circle. In another preferred embodiment, the second circle has a substantially equal or slightly longer radius than the first circle.

This invention further discloses a data access system for accessing data on a flat medium. The data access system further includes a pickup head rotating over the flat medium. The system includes at least a stepping motor for discretely moving the flat medium substantially along at least a lateral direction perpendicular to a rotational axis of the pickup head for moving the pickup head for access data stored in stepwise discrete segments. In a preferred embodiment, the data access system further includes a controller for employing a closed loop control mechanism for controlling the stepping motor for reading data from a servo segment on the flat medium. The controller further applies an open loop control mechanism for controlling the pickup head for reading data from and writing data to a data segment on the flat medium. In another preferred embodiment, the open loop control mechanism further includes position sub-correction means for carrying out at least one sub-correction in sweeping over one of the data segments. In another preferred embodiment, the data access system is an optical data access system. In another preferred embodiment, the data access system is a magnetic data access system. In another preferred embodiment, the controller further includes a profile calibration processor for reading servo data from a plurality of servo segments for recording and minimizing a position error for each of the servo segments. In another preferred embodiment, the controller further includes a flat medium centering processor for reading servo data from two servo segments on two opposite sides of the flat medium for centering the flat medium relative to the pickup head. In another preferred embodiment, the controller further includes a sector offset processor for calculating a sector offset for controlling a movement of the pickup head from one sector to another sector on the a flat medium.

This invention further discloses a method for providing a plurality of substantially parallel data tracks on a flat data-storage medium. The method includes a step of segmenting each of the data tracks into a plurality of stepwise discrete segments. In another preferred embodiment, the step of segmenting each of data track into the stepwise discrete segments further comprising a step of dividing each of the segments into a servo segment and a data segment. In another preferred embodiment, the step of dividing each of the segments into a servo segment and a data segment further comprising a step of forming each of the servo segments substantially as a circumference segment of a first circle. And the step further includes a step of forming each of the data segments substantially as a circumference segment of a second circle where the first circle and the second circle have radiuses of different lengths. In another preferred embodiment, the step of forming the servo segment and the data segment further comprising a step of forming the servo segment and the data segment with the second circle has a substantially equal or slightly shorter radius than the first circle. In another preferred embodiment, the step of forming the servo segment and the data segment further comprising a step of forming the servo segment and the data segment with the second circle has a substantially equal or slightly longer radius than the first circle.

This invention further discloses a method of configuring a data access system for accessing data on a flat medium. The method includes steps of providing a pickup head for rotating over the flat medium. The method further includes a step of providing at least one stepping motor for discretely moving the flat medium substantially along at least one lateral direction perpendicular to a rotational axis of the pickup head for moving the pickup head to access data stored in stepwise discrete segments. In a preferred embodiment, the method further includes a step of providing a controller for employing a closed loop control mechanism for controlling the stepping motor for reading data from a servo segment on the flat medium. And, the method further includes a step of employing an open loop control mechanism for controlling the pickup head for reading data from and writing data to a data segment on the flat medium.

Therefore, the present invention discloses a data storage-card drive system with a pickup head moving above the data-storage card in rotational movement. The data read-write functions are enabled only for arc-segments of the rotational movement guided by servo data written to servo sectors on the data arc with proper offsets. Also, the data tracks are arranged as plurality of discrete segments each segment includes a servo segment and a data segment. Specifically, a pickup head driven by a motor, e.g., a brushless motor, rotates over the data-storage card with the rotation axis perpendicular to the card surface. The motor is mounted on a carriage for making vertical movement perpendicular to the data card for engaging and disengaging a signal pick up head to a flat media per data retrieving and recording configurations. An X-Y table is provided driven by a pair of stepping motors to move and position the card on the center relative to the rotation of the pickup head in addition to position the selected data track under a signal pick up head for proper data retrieving and recording process.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A data card has a plurality of data tracks disposed on a flat data-storage medium wherein:

each of the data tracks further includes a plurality of stepwise discrete segments;

each of said segments further includes a servo segment and a data segment wherein each of said servo segments is substantially a circumference segment of a first circle; and each of said date segments is substantially a circumference segment of a second circle where said first circle and said second circle have radiuses of different lengths.

2. The data card of claim 1 wherein:

said second circle has a substantially equal but slightly shorter radius than said first circle.

3. The data card of claim 1 wherein:

said second circle has a substantially equal but slightly longer radius than said first circle.

4. A method for providing a plurality of substantially parallel data tracks on a flat data-storage medium comprising a step of:

segmenting each of the data tracks into a plurality of discrete segments and dividing each of said segments into a servo segment and a data segment by forming each of said servo segments substantially as a circumference segment of a first circle; and forming each of said data segments substantially as a circumference segment of a second circle where said first circle and said second circle have radiuses of different lengths.

5. The method of claim 4 wherein:

said second circle has a substantially equal but slightly shorter radius than said first circle.

6. The method of claim 4 wherein:

said second circle has a substantially equal but slightly longer radius than said first circle.

* * * * *